United States Patent [19]
Matsui et al.
[11] 4,289,227
[45] Sep. 15, 1981

[54] BELT CONVEYER TRANSPORTATION SYSTEM UTILIZING MAGNETIC ATTRACTION

[75] Inventors: Kazumi Matsui, Yokohama; Takashi Takasue, Kawaguchi; Masami Iwasaki, Tokyo, all of Japan

[73] Assignee: Furukawa Electric Co. Ltd., Tokyo, Japan

[21] Appl. No.: 70,823

[22] Filed: Aug. 29, 1979

Related U.S. Application Data

[62] Division of Ser. No. 791,141, Apr. 26, 1977, Pat. No. 4,197,934.

[30] Foreign Application Priority Data

| | | | |
|---|---|---|---|
| Apr. 28, 1976 | [JP] | Japan | 51-47880 |
| May 25, 1976 | [JP] | Japan | 51-59590 |
| Jun. 15, 1976 | [JP] | Japan | 51-69276 |
| Jul. 6, 1976 | [JP] | Japan | 51-79426 |
| Aug. 25, 1976 | [JP] | Japan | 51-100647 |
| Sep. 30, 1976 | [JP] | Japan | 51-116509 |
| Oct. 6, 1976 | [JP] | Japan | 51-119313 |
| Oct. 12, 1976 | [JP] | Japan | 51-121341 |
| Nov. 10, 1976 | [JP] | Japan | 51-134185 |
| Jan. 11, 1977 | [JP] | Japan | 52-1133 |

[51] Int. Cl.[3] .......... B65G 17/00; B61B 13/14; B61K 1/00

[52] U.S. Cl. .......... 198/334; 104/20; 198/472; 198/690

[58] Field of Search .......... 198/324, 334, 690, 817, 198/579, 472; 104/18, 20, 25, 165, 172 S, 287, 288, 28, 29, 30

[56] References Cited

U.S. PATENT DOCUMENTS

| | | | |
|---|---|---|---|
| 722,937 | 3/1903 | Begg | 198/579 |
| 1,102,231 | 7/1914 | Begg | 104/20 |
| 1,412,969 | 4/1922 | Sachs | 104/25 |
| 1,665,483 | 4/1928 | Taylor | 198/324 X |
| 1,689,201 | 10/1928 | Halter | 198/579 |
| 3,265,010 | 8/1966 | Makiri | 198/324 |
| 3,518,944 | 7/1970 | Patin | 198/334 X |
| 3,757,700 | 9/1973 | Nagakawa et al. | 104/165 |

FOREIGN PATENT DOCUMENTS

| | | | |
|---|---|---|---|
| 363648 | 2/1973 | U.S.S.R. | 198/324 |

*Primary Examiner*—James L. Rowland
*Attorney, Agent, or Firm*—Haseltine and Lake

[57] ABSTRACT

A belt conveyor transportation system includes a plurality of belt conveyor units each having an endless belt whose main constituent element consists of a magnetic material so as to be magnetically attractive with magnets, and the conveyor units are continuously arranged lengthwise along a desired transportation network layout to form a conveyor line. The conveyor units of the conveyor line drive their magnetic belts separately or in groups each including a number of the units at an independent speed. A moving body or bodies are arranged to move along the conveyor line, and the moving member includes a magnet system. By virtue of the magnetic attraction between the conveyor units and the magnet system, the moving member travels along the conveyor line while being hauled by the magnetic belts of the conveyor units at their respective speeds.

5 Claims, 49 Drawing Figures

FIG. 23
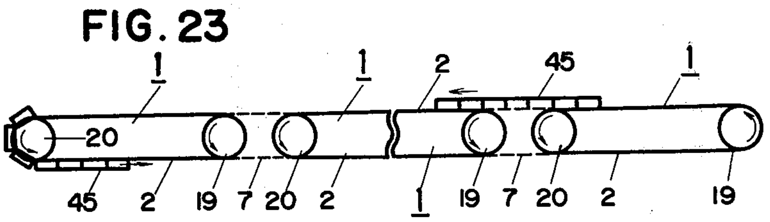
FIG. 24
FIG. 25
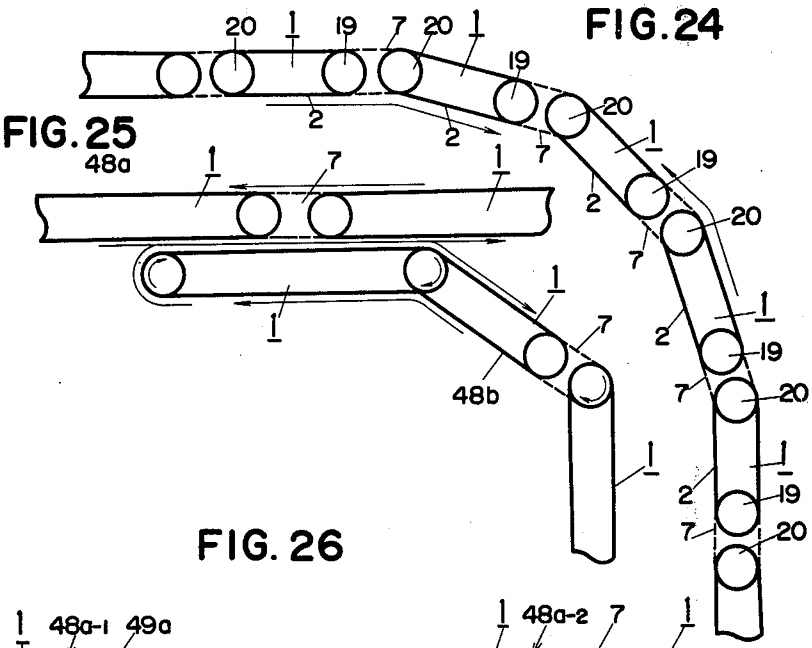
FIG. 26
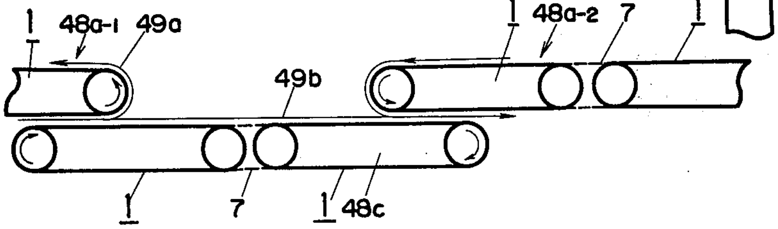

BELT CONVEYER TRANSPORTATION SYSTEM UTILIZING MAGNETIC ATTRACTION

This is a division of application Ser. No. 791,141 filed Apr. 26, 1977, now U.S. Pat. No. 4,197,934.

BACKGROUND OF THE INVENTION

The present invention relates to a belt conveyor transportation system which utilizes magnetic attraction as a hauling force for moving a traveling member or members.

Recently, a continuous transportation system of the type which is always moved continuously without interruption at speeds higher than a predetermined speed and falling within a certain speed range of between 20 and 60 km/hr, for example, has been advocated as a city communication and transportation system which occupies a reduced space and capable of mass transportation. However, if such a continuous transportation system is constructed on the principle of a conveyor belt, the resulting system has various disadvantages that the maximum speed is limited to a low value due to the limited capacity of the belt conveyor itself, that when it is desired to somewhat decelerate transport cars while going up or down a grade or while going round a curved section in a horizontal direction, the speed of the transport cars while passing from one to another of the continuously arranged units of the belt conveyor cannot be changed so greatly that it is necessary to use a large number of shorter units in order to provide the desired deceleration or acceleration within the specified line, and so on. Further, in order that people may get on and off or goods may be loaded or unloaded from the transport cars of the continuous transportation system at a stationary or stopping place on the ground, for example, without causing a shock due to the difference in speed between the cars and the stop, it is necessary to use a transfer junction device having a speed changing function for gradually reducing the relative speed difference between the cars and the device, namely, a variable speed junction device (hereinafter referred to as an integrator) having a function so that the speed difference between the cars of the continuous transportation system and a stationary place on the ground or the like is extended in time so as to accelerate or decelerate the people or goods with the permissible desired positive or negative acceleration to permit the people to get on and off the cars or the loading and unloading of the goods. While, as an example of such integrator, a mechanism has been generally conceived in which belt conveyors are combined in a multi-stage arrangement so that the speeds of the stages differ from one another and thus the speed of the mechanism is changed stepwise, it has been considered that the mechanism must be specially designed so as to preset the steplike different speeds to the conveyors as desired, and this results in a complicated structure. Namely, the integrator includes five sections, i.e., the first constant speed section movable at a constant speed which permits people, e.g., pedestrians to get on or goods to be loaded on the cars easily from the stationary place on the ground or the like, the acceleration section connected to said constant speed section, the second constant speed section which is connected to said acceleration section and permits easy transfer of people or goods to the cars of the continuous transportation system that are continuously moving at a constant speed higher than a predetermined speed, and a deceleration section which is connected to the second constant speed section to continuously join it to the third constant speed section moving at a constant speed which permits easy transfer of the people or goods from the cars to a stationary place, that is, if the speeds of the first and third constant speed sections are the same, the integrator is roughly divided into four sections of different speeds, and consequently the speed variation around the junction point between the other conveyors in the acceleration and deceleration sections and between the respective sections must be preset so that the positive or negative acceleration is limited to lower than the permissible absolute value for both people and goods, namely, less than about 10.051 g. As a result, due to these restrictions to the steplike different speeds between the adjoining conveyors forming the integrator, the construction of the integrator becomes complicated and large, though this is affected by the traveling speed of the cars on the continuous transportation system.

SUMMARY OF THE INVENTION

It is a principal object of this invention to provide a transportation system in which a moving member is caused by means of magnetic attraction to haul the movement of the belt of a conveyor, thereby eliminating the use of means of imparting adhesive driving force due to frictional force.

It is another object of this invention to provide a belt conveyor transportation system which is well suited for use as a continuous transportation system or integrator for city transportation system, a conveyance system in a factory, etc.

It is still another object of this invention to provide a belt conveyor transportation system in which both outersides of the belt of a belt conveyor in the parallel portions thereof can be utilized effectively.

More specifically, in the transportation system provided according to this invention, the transportion network consists of a conveyor line having a plurality of conveyor units continuously connected in a lengthwise direction. Each of the conveyor units comprises a pair of driving and idle wheel assemblies which are arranged in parallel and spaced away from each other, and an endless belt which is made from a magnetic material as a main constituent element and encircled over the pair of driving and idle wheel assemblies. The conveyor line is formed by arranging the conveyor units in such a manner that both outersides of the belt in the parallel belt portions are arranged to face vertically or laterally. The conveyor units continuously arranged to form the conveyor line are spaced away from each other and interconnected by means of connecting belts into a continuous conveyor line or, alternately, the driving wheels at one end of the conveyor unit may be arranged on the same shaft as the idle wheels at another end of the adjoining conveyor unit in a superposing relation so that the magnetic belt may be encircled over these wheels, respectively, thus interconnecting the conveyor units into a single continuous conveyor line. A moving member is arranged to be movable along the conveyor line, and the movable member is provided with magnet means comprising permanent magnets or electromagnets. The magnet means provides magnetic attraction between the moving member and the magnetic belts of the conveyor units so that the moving member is moved by this magnetic attraction to follow the movement of the circulating magnetic belts. The conveyor units of the conveyor line are arranged to drive their magnetic belts at their own speeds, and consequently the speed of the moving member is governed by the circulating speed of the magnetic belts of the respective conveyor units in the conveyor line. In those portions where the moving member is movable by inertial effects, the magnetic belts are not arranged in the predetermined position.

The moving member should preferably be supported on or suspended from supporting means which is rolled or slid over a separately provided guide traveling path along the conveyor line, and this supporting means may be comprised of a truck having wheels or sledge. Where the magnet means of the moving member comprises electromagnets, feeders are provided along the guide traveling path, and the moving member is provided with current collectors for receiving electric power through the feeders and energizing the electromagnets.

For instance, where the transportation system of this invention is used as an integrator, the moving body may be comprised of a platform body having a flat upper surface, and the conveyor line may be provided with the previously mentioned five sections so that a plurality of such platforms are moved successively on the conveyor line. Thus, when a pedestrian gets on the platform in the lowest speed section, the platform carrying the pedestrian thereon is smoothly accelerated so that the platform is moved at substantially the same speed as the traveling cars of the continuous transportation system in parallel and in the same direction therewith, thus permitting the people to transfer onto the traveling car. Of course, the people on the car may transfer onto the platform in the similar manner so that the platform is smoothly decelerated and arrives in the lowest speed section. It is possible to arrange so that the platform is circulated by turning around the outer surface of the end wheel of the conveyor unit at each end of the conveyor line.

Further, if the transportation system of the present invention is used as a continuous transportation system, for example, the moving members may be comprised of passenger cars or freight cars which in turn moved continuously along the conveyor line in accordance with the desired speed pattern.

In accordance with the present invention, the moving member is provided with no driving source and its running speed is solely controlled by controlling the operation of the conveyor units. Thus, there is no need for any operator to ride on the moving members and the moving members can be subjected to an external centralized control.

More detailed objects and construction of the present invention will become more readily apparent from considering the following detailed description taken in conjunction with the accompanying drawings.

BRIEF DESCRIPTION OF THE DRAWINGS

FIG. 23 is a plan view showing an exemplary arrangement of the conveyor lines according to the a first embodiment.

FIG. 24 is similar to FIG. 23 showing another arrangement of the conveyor lines.

FIG. 25 is similar to FIG. 23 showing another arrangement of the conveyor lines.

FIG. 26 is similar to FIG. 23 showing another arrangement of the conveyor lines.

DESCRIPTION OF THE PREFERRED EMBODIMENTS

Figure 1A:
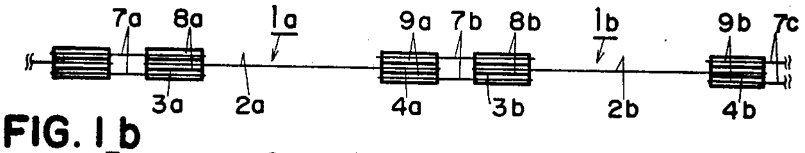
FIG. 1*a* is a plan view showing the construction of a part of a conveyor line according to an embodiment of this invention.
Figure 1B:
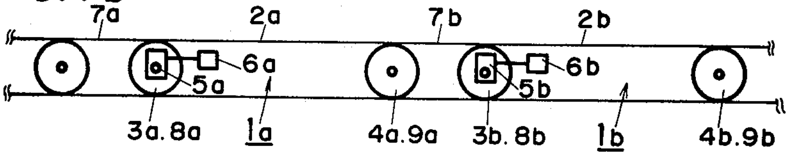
FIG. 1*b* is a side view of FIG. 1*a*.

FIGS. 1*a* and 1*b* are respectively a plan view and a side view showing the construction of a part of a conveyor line according to the invention, and conveyor units $1_a$, $1_b$, . . . , constituting the component units of the conveyor line, comprise any desired number of endless magnetic belts $2_a$, $2_b$, . . . , each made from a magnetic material or a composite structure of a magnetic material and other material and constituting conveyor belts, and the magnetic belts $2_a$, $2_b$, . . . are passed over driving wheels $3_a$, $3_b$, . . . and idle wheels $4_a$ and $4_b$. The conveyor units $1_a$ and $1_b$ are designed so that the units are separately driven at a desired speed from motors $6_a$ and $6_b$ through power transmission units $5_a$ and $5_b$ such as worm gear units. These conveyor units $1_a$, $1_b$, . . . are arranged along the direction of travel describing a desired path, and connecting belts $7_a$, $7_b$, . . . are passed over the adjoining units to interconnect the units, namely, the connecting belts are passed over the driving wheels of one of the adjoining units and the idle wheels of the other units which are arranged on the same axes, i.e., over driving wheels $8_a$, $8_b$, . . . and idle wheels $9_a$, $9_b$, . . . . The connecting belts may be made from a non-magnetic material in view of their function which will be described later. Thus, with the conveyor line constructed as described above, the individual units are separately driven by their own motors with the result that each unit is imparted with its own speed level and this permits the speed pattern of the line to be preset as desired.

Figure 2A:
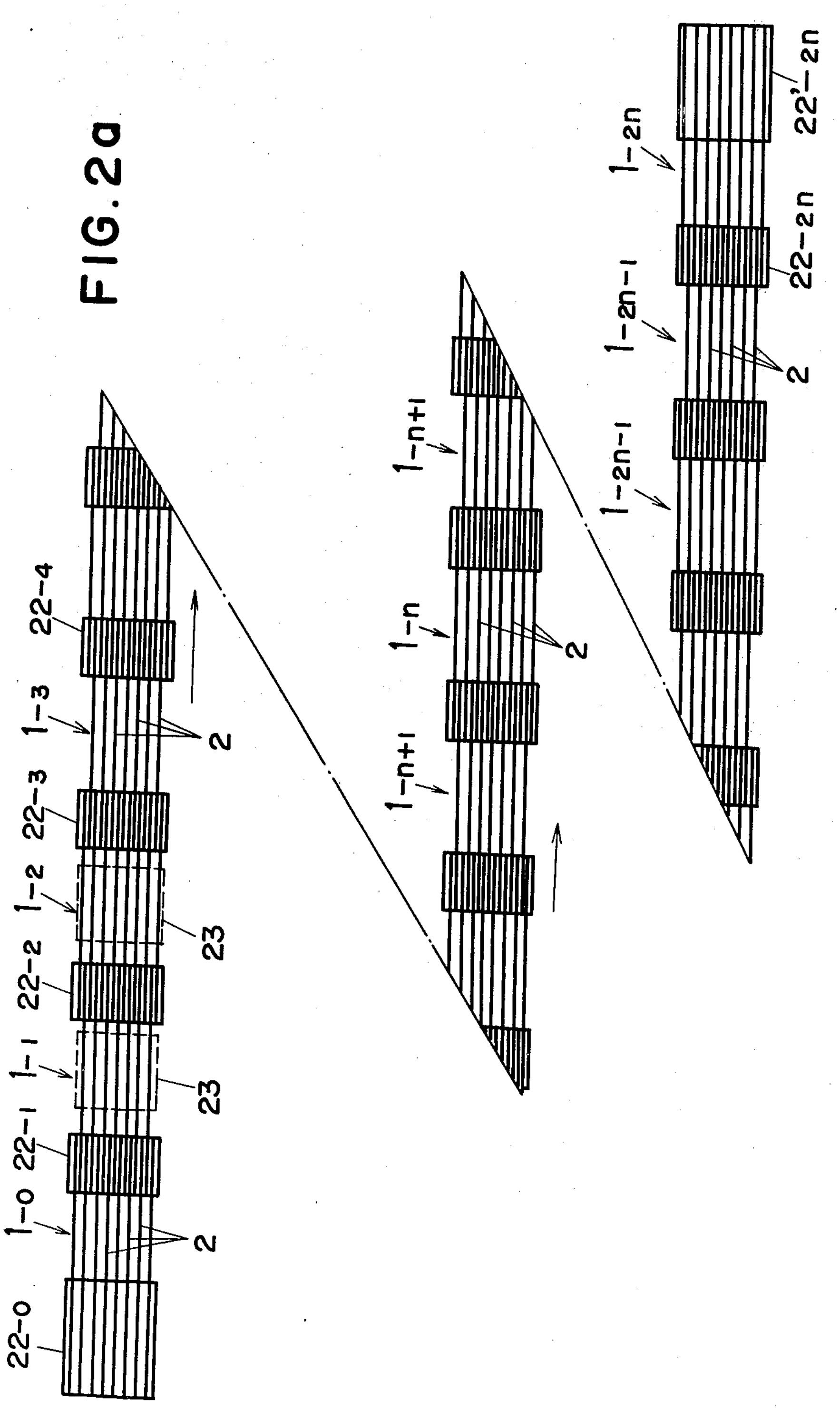
FIG. 2*a* is a plan view showing the general construction of the conveyor line according to another embodiment of this invention, with the part thereof being omitted.
Figure 2B:
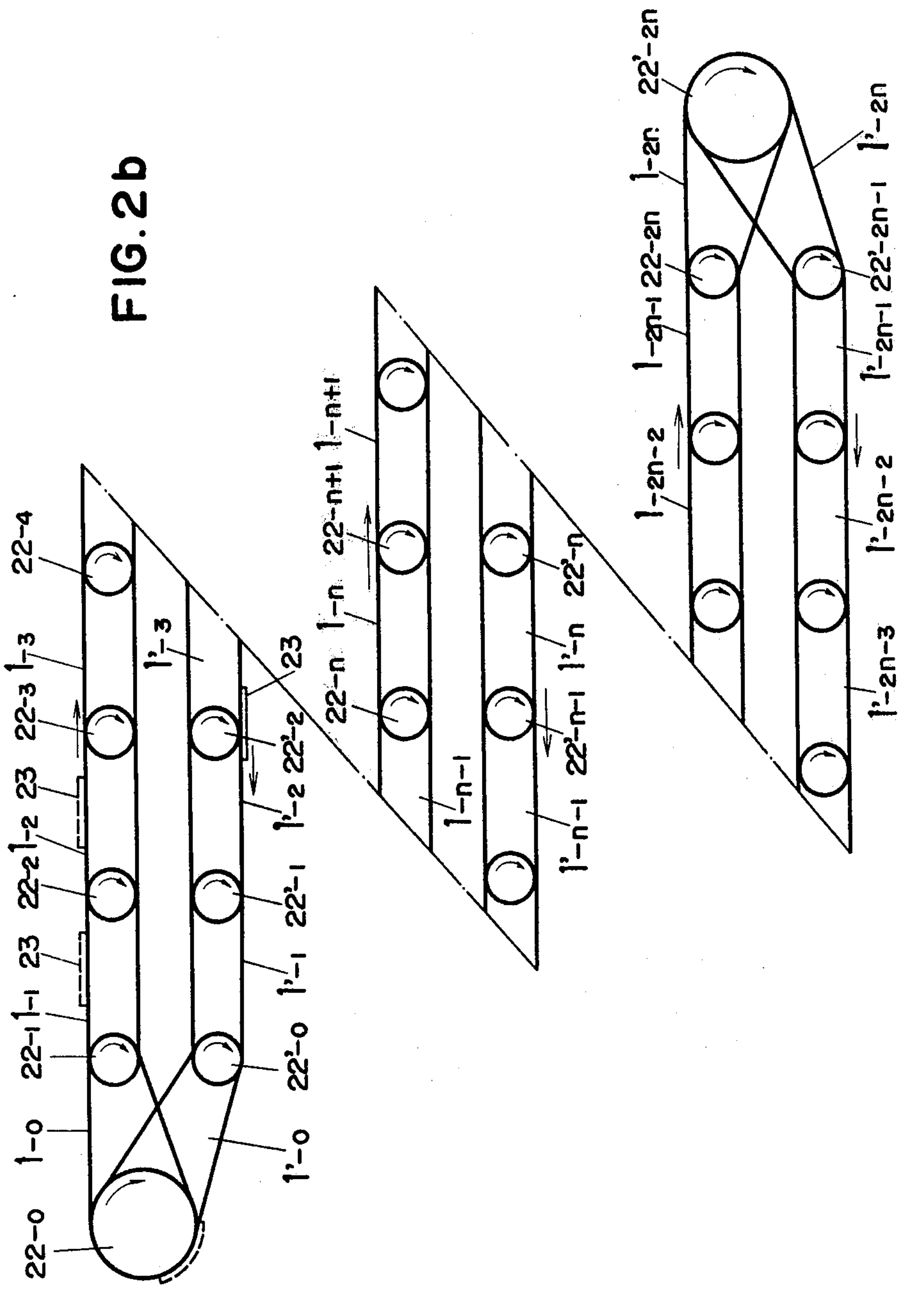
FIG. 2*b* is a side view of FIG. 2*a*.

While the above-described conveyor line comprises a plurality of the conveyor units connected with one another by the connecting belts thus forming the continuous line, FIGS. 2*a* and 2*b* show another form of the conveyor line in which the individual units are interconnected without using any connecting belts.

Figure 3:
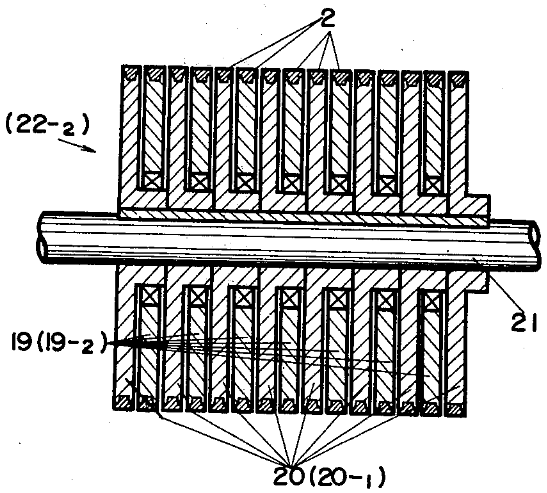
FIG. 3 is a sectional of a composite wheel used in the embodiment of FIG. 2.

FIGS. 2*a* and 2*b* are, respectively, a plan view and a side view showing the construction of a conveyor line according to another embodiment of the invention with part thereof being omitted. Namely, the previously mentioned first constant speed section, acceleration section, second constant speed section, deceleration section and third constant section are provided by a plurality of conveyor units $1\text{-}_0$, $1\text{-}_1$, $1\text{-}_2$, . . . , $1\text{-}_n$, . . . , $1\text{-}_{2n}$, and a similar plurality of conveyor units $1'\text{-}_{2n}$, $1'\text{-}_{2n\text{-}1}$, . . . $1'\text{-}_0$ provide a return line which interconnects the conveyor units $1\text{-}_{2n}$ and $1\text{-}_0$ through a separate route. In this case, as shown in FIG. 3, each conveyor unit comprises a plurality of conveyor elements arranged at equal spacing in the width direction of the conveyor line and having magnetic belts 2 passed over thin idle wheels 19 and driving wheels 20 so as to provide belt driving by the rotation of a drive shaft 21, and moreover the pitch of the conveyor elements in each of the adjoining conveyor units is deviated from one another to form composite wheels $22\text{-}_0$, $22\text{-}_1$, . . . , . . . $22'\text{-}_0$ in each of which the driving wheels of one conveyor unit and the idle wheels of the other conveyor unit are alternately arranged on the same shaft. These conveyor units are arranged in a line. As an example of the composite wheels, a composite wheel $22\text{-}_2$ for the conveyor units $1\text{-}_1$ and $1\text{-}_2$ will be described with reference to FIG. 3, in which a plurality of driving wheels $20\text{-}_1$ of the conveyor units $1\text{-}_1$ and a plurality of idle wheel $19\text{-}_2$ of the conveyor unit $1\text{-}_2$ are alternately arranged on the same axis in such a manner that the driving wheels $20\text{-}_1$ are rotated by the common shaft or driving shaft 21 while allowing the idle wheels $19\text{-}_2$ to freely rotate as idlers, and the magnetic belts of the unit $1\text{-}_1$ are passed over the driving wheels $20\text{-}_1$ and the magnetic belts of the unit $1\text{-}_2$ are passed over the idle wheels $19\text{-}_2$.

With the thusly constructed narrow multi-belt conveyor line, the magnetic belts of each unit are independent of the magnetic belts of other units, with the result that each unit provides by its driving wheels a desired independent rotational speed and thereby provides the conveyor line with a desired speed distribution. A drive unit for this conveyor line must be capable of controlling the traffic volume per unit time of the conveyor line in accordance with the density of passengers from standpoint of economical energy consumption, and thus means for adjusting the traveling speed of the magnetic belts is necessary. In addition, the traveling speed of the magnetic belts of the conveyor units forming the conveyor line as well as the speed ratio of the magnetic belts must be stable from the standpoint of, for example, minimizing such a shock to the passengers on moving platforms (which will be described later) as caused by a sudden change in the rotational speed of the driving wheels of the conveyor units. Still further, the drive unit should preferably be provided with a control mechanism so that in case of an emergency the magnetic belts of the conveyor units may be stopped in a short period of time to stop the movement of the platforms simultaneously. For this reason, it is considered perferable to use a drive unit which is designed to drag the driving wheels of any desired number of conveyor units with the same driving line and the same driving source and which uses an electric motor, preferably a variable speed electric motor for the driving source. In this case, a gear mechanism is provided to drag the driving wheels of each conveyor unit so that the gear mechanism is coupled with a desired gear ratio with the common driving shaft rotatable in synchronism with the motor so as to provide the desired speed levels for the magnetic belts of any desired number of conveyor units and also maintain the desired speed ratio between the magnetic belts, and magnetic coupling devices of the type which produces a slip at a desired load torque are also provided to couple the common shafts to the output shaft of the motor and interconnect the common driving shafts of the driving wheels of the desired number of the conveyor units.

A particularly preferred type of such variable speed motor is one in which the rotor consists of a permanent magnet or iron core electromagnet, and the stator consists of an armature coil of the type having the coil shape and arrangement of the linear motor ground coil shown in U.S. Pat. No. 3,924,537 or 3,806,782, namely, an armature coil in which adjacent wave shape or lap winding rectangular coils are connected in series at desired spacing in such a manner that the coils have a phase difference of $2\pi$ with respect to each other and an even number of such coil rows are arranged so as to be deviated from each other by a predetermined phase, and it is desirable to accomplish the speed control or the control of forward and reverse rotation of the motor by forcibly commutating the current flowing from a DC constance current source into the armature coil by a thyristor flip-flop circuit.

On the other hand, while the magnetic belt may be in the form of a magnetic chain, magnetic coil spring, endless track (caterpiller) consisting of bar members connected together by joints, strand of a simple rod material or any of various other structures, it is preferable to enclose any of such materials with rubber or elastomer and then mold the same in consideration of wear of the magnetic belts by the driving wheels and idle wheels at the ends of the conveyor unit or the rubbing against each other of the magnetic belts in the case of a multiple-belt arrangement. A plurality of magnetic belts may be arranged in parallel within a single molded belt. When a platform, which will be described later, passes from one to another of the belts rotating at different traveling speeds, a change in the speed of the platform causes a variation with time of the amount of magnetic flux passing through the belt, and an induced voltage is produced in the magnetic belt in a direction to prevent such change in the magnetic flux. This induced voltage tends to cause a flow of undersirable current between the magnetic belts which are generally good electric conductors, between the magnetic belts and the metallic driving wheels and also between the driving wheels and the ground, thus causing electrolytic corrosion of these component members. Further, where the magnetic belt surface disposed to face the platforms tends to deflect due its own weight, thermal expansion, etc., it is desirable to reduce such deflection as far as possible to suit the rotational speed of the driving wheels or the traveling speed of the magnetic belt, whereas where the magnetic belt is subjected to an excessive tension, it is also desirable to relieve such tension. Consequently, if a chain or endless trick which is an assembly of rigid members, is used for the magnetic belt, it is necessary to use a mechanism for adjusting the distance between the wheel assemblies at the ends of each conveyor unit so as to reduce the deflection or excessive tension in the magnetic belt or belts which have passed over these wheels, and this inevitably makes the system more complicated. The abovementioned molded belt structure eliminates all of these problems, and moreover this molded structure imparts some elasticity to the magnetic belt.

Figure 4:
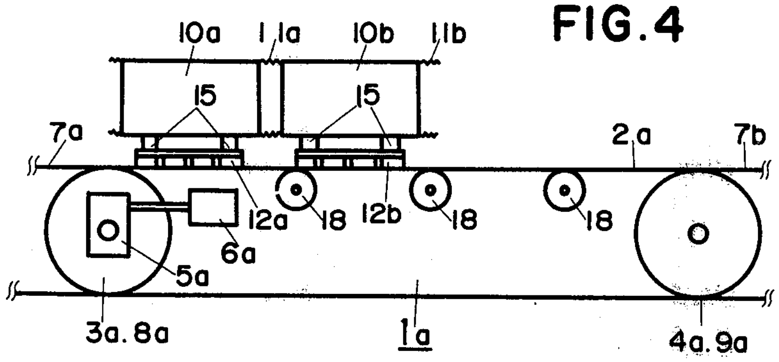
FIG. 4 is a side view showing the relationship between moving members or cars and the conveyor line according to the first embodiment.

FIG. 4 is a side view showing an exemplary arrangement of the conveyor unit $\mathbf{1}_a$ and the connecting belts $\mathbf{7}_a$ and $\mathbf{7}_b$ which are shown in FIGS. 1*a* and 1*b* and moving objects or cars $\mathbf{10}_a$ and $\mathbf{10}_b$ which are movable over the upper surface of the magnetic belt $\mathbf{2}_a$ in synchronism with the speed of the conveyor unit $\mathbf{1}_a$, and the cars $\mathbf{10}_a$ and $\mathbf{10}_b$ are coupled by means of flexible coupling devices $\mathbf{11}_a$, $\mathbf{11}_b$, . . . . While the number of cars to be coupled is determined in various ways depending on the intended purposes, if, for example, the conveyor line is the form of a circular endless path, a large number of cars may be coupled to form a circular endless train which covers the entire endless path. Since the speed difference which may occur between the succeeding cars can be usually determined in the course of design, the range of expansion and contraction of the coupling devices may be suitably determined in accordance with the maximum value of the spacing between the cars due to the speed difference so as to prevent the traveling speed of the train from being affected by any possible variation of the car spacing or variation of the train length.

These cars are provided with field systems $\mathbf{12}_a$, $\mathbf{12}_b$, . . . comprising magnet means consisting, for example, of electromagnets and having their pole faces opposed to the magnet belts, and current collectors which are not shown are also provided on the cars to provide a power supply system for energizing the electromagnets of the field systems. Electric wires are also laid along the conveyor line. As a result, when the field systems are energized, the magnetic flux of the field systems pass through the magnetic belts producing magnetic attraction therebetween, with the result that the cars travel along the conveyor line to follow the circular movement of the magnetic belts in synchronism therewith at their predetermined speeds in accordance with the pattern and with a linear speed variation instead of the steplike speed variation of the conveyor units. As will be described later, the cars travel with their wheels being carried on the traveling tracks provided along the conveyor line, and consequently by designing the field systems so as to provide such magnetic attraction which is far greater than the running resistance of the cars including possible variation of the running resistance due to changes in the weight of the load, generally the cars can be forcibly pulled mainly by the magnetic attraction to move at a speed corresponding to the movement of the magnetic belts. In this case, if the field systems are mounted on the cars through the intermediary of supporting means 15 having a suitable resilience, the field systems will be caused to adhere to the magnetic belts while maintaining a surface-to-surface contact therebetween or a gap smaller than a predetermined value which does not ruin the magnetic attraction sufficient to forcibly move the cars, thereby enabling the car to follow the movement of the magnetic belts at the same speed.

Figure 5:
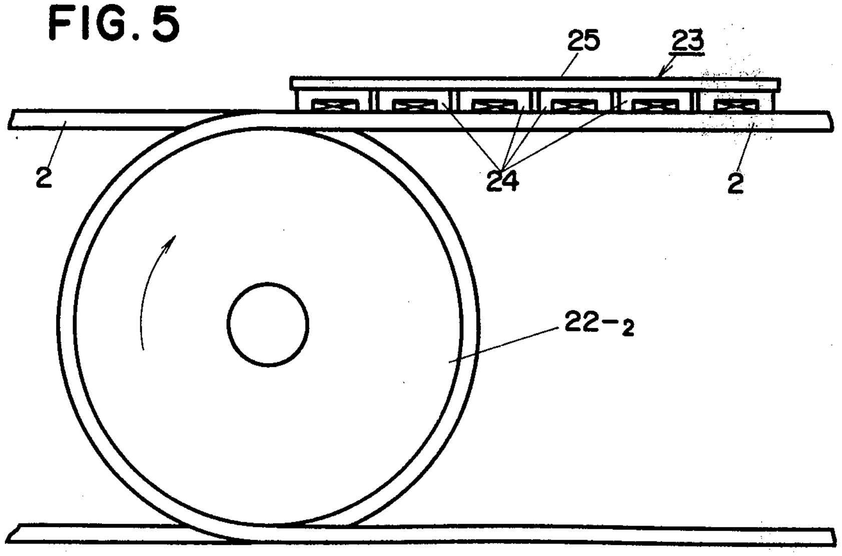
FIG. 5 is a sectional view showing the relationship between the moving member or platform and the conveyor line according to the second embodiment.
Figures 6A, 6B, 6C:
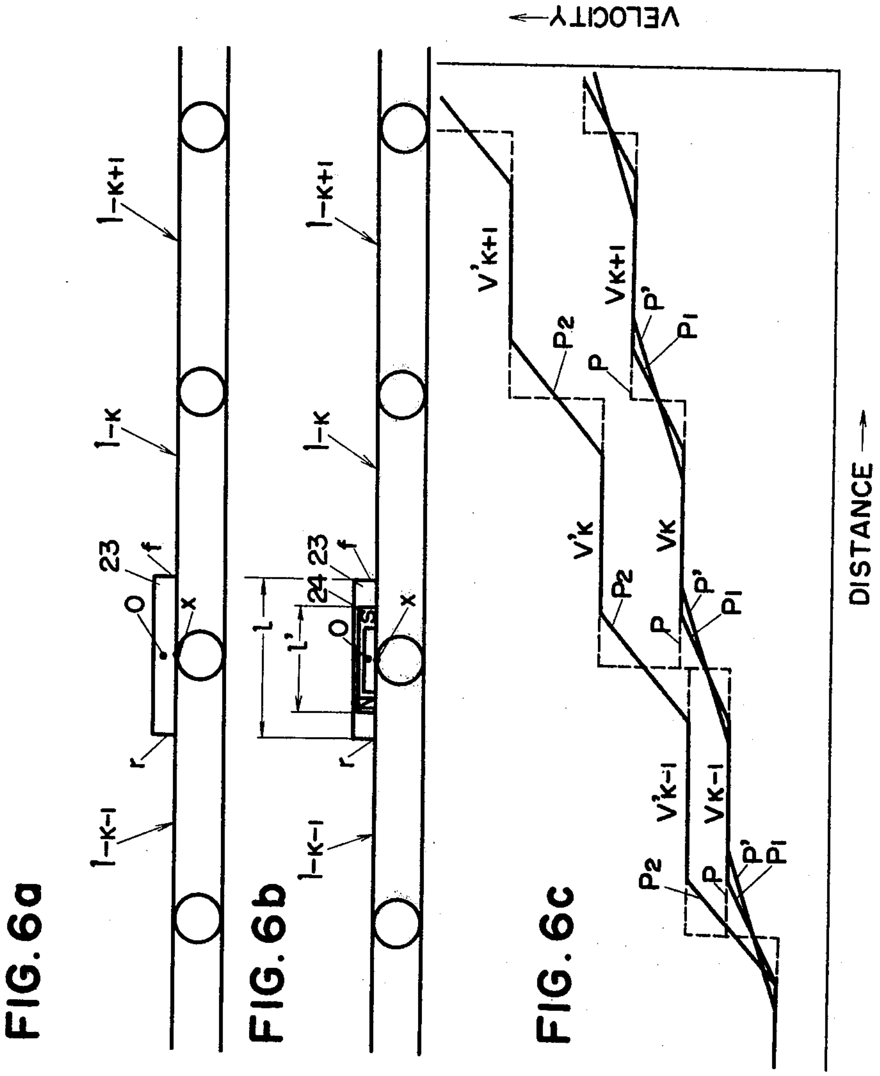
FIG. 6*a* is a partial side view showing the movement of the platform with no magnetic attraction acting thereon.
FIG. 6*b* is a similar partial side view showing the movement of the platform with magnetic attraction acting thereon.
FIG. 6*c* is a graph showing the changes in the speed of the platform under the conditions shown in FIGS. 6*a* and 6*b*.

While the above-mentioned cars may be formed into a train, in case the moving objects are to be moved at relatively low speeds, the moving objects may be freight cars or platforms designed to simply carry people. In the case shown in FIGS. 2*a* and 2*b*, the conveyor line includes a noninterrupted continuous belt surface, and consequently the above-mentioned platform may be carried on the belt surface to thereby use the conveyor line as an integrator. In FIGS. 2*a* and 2*b*, numeral 23 designates platforms adapted to travel by following the movement of the magnetic belts 2 of the conveyor line, and the platforms are provided with field systems comprising magnet means consisting of electromagnets or permanent magnets for producing the required magnetic attraction between the platforms and the magnetic belts. In other words, as shown in FIG. 5, a plurality of magnet means 24 extending in the width direction of the platform are arranged on the lower surface of the platform 23 by a suitable supporting structure over the lengthwise direction of the platform, thus forming a field system covering the entire lower surface of the platform. The magnetic flux produced by the field system pass through the magnetic belts 2 so that magnetic attraction is produced between the platform and the magnetic belts, and consequently by suitably designing the field system it is possible to cause the platform to follow the movement of the magnetic belts through the traction by the magnetic attraction. The platform 23 illustrated by way of example in FIGS. 2*a* and 2*b* and FIG. 5, is held fast to the surface of the magnetic belts 2, and consequently the load of the platform due to its own weight also acts between the platform and the conveyor units in addition to the magnetic attraction. Assuming now that the platform has a field system so that no magnetic attraction is produced or an insufficient magnetic attraction is provided, as shown in FIGS. 6*a* and 6*c*, the force acting to cause the platform 23 to follow the changes in the speed of conveyor units $1\text{-}_{k-1}$, $1\text{-}_k$, $1\text{-}_{k+1}$, . . . includes only the adhesion produced by the frictional force of the platform acting on the surface of the magnetic belts, with the result that in order that the platform 23 may pass from the unit $1\text{-}_{k-1}$ having a peripheral speed $V_{k-1}$ to the unit $1\text{-}_k$ having a higher peripheral speed $V_k$ and from the unit $1\text{-}_k$ to the unit $1\text{-}_{k+1}$ with a still higher peripheral speed $V_{k+1}$, it is necessary to accelerate the platform from the speed $V_{k-1}$ to $V_k$ and then from $V_k$ to $V_{k+1}$. However, if, in this case, the speed difference between the units is so great in relation to the frictional force between the platform and the unit surface, the platform only slips, and therefore it is necessary to limit the speed differences to relatively small speed differences of a range which can be met by the frictional force and thereby set the speed distribution of the units as shown by a dotted curve P in FIG. 6*c*, thus allowing the platform to change its speed without any slipping as shown by a solid line P′ in FIG. 6*c*. Thus, a longer traveling distance is required for the platform to accelerate from a low speed which permits transfer of people to the desired speed level, and consequently it is possible to construct only a long and larger transportation system. Moreover, since the frictional force is dependent on the angle (inclination) of the platform moving surface of the conveyor line with respect to the direction of gravity, the mass of the people or goods carried by the platform, and variation in the friction coefficient of the magnetic belt surface due to rain, snow, contamination, wear and the like, even if the angle of the platform moving surface and the friction coefficient are designed to be constant, it is impossible to eliminate variation in the mass of the platform or variation of the coefficient of friction within the effective surface unless the weight of the platform is increased to such an extent that variation of the friction coefficient due to variation of people or goods can be held extremely small within the limits of practical use. Consequently, the speed change of the platform passing from one to the other of the adjoining conveyor units tends to become unstable thus causing failure of the platform speed to synchronize with the belt speed of the unit onto which the platform has passed, and in particular there is the danger of the platform overrunning in the deceleration section. In this case, since only the adhesion caused by the gravity between the platform and the belt is utilized for driving the platform, the return line of the conveyor line cannot be utilized as a line for returning the platform to the starting point as shown in FIG. 1*b*, and it is thus necessary to newly provide a separate return line.

On the other hand, since the platform used in this invention is provided with a field system, magnetic attraction is caused between the field system and the magnetic belts so that the platform travels by following the circulating movement of the magnetic belts. In other words, in FIGS. 6*b* and 6*c*, the magnetic attraction acting between the platform 23 and the magnetic belt surface of the units is far greater than the load of the platform due to the gravity, and assuming that the average center O of the platform (hereinafter referred to as a field system center) is at the center of a leading edge f and a trailing edge r of the platform and that l represents the length of the platform and l′ represents the length of the field system which is $l' < l$ (the field system center coincides with the platform center by way of preferable example for purposes of discussion, and they need not always coincide with each other), it can be considered that the magnetic attraction alone substantially contributes in causing the platform to follow the movement of the magnetic belts, and consequently so far as the entire length of the field system is over the unit $1\text{-}_{k-1}$ of the speed $V_{k-1}$ the platform 23 travels by following the movement of the unit at the speed $V_{k-1}$. Then, when the leading edge f of the platform passes onto the following unit $1\text{-}_k$ having a steplike speed difference with respect to the unit $1\text{-}_{k-1}$ as shown by the dotted line P and also the leading edge of the field system comes to a boundary point x between the units, the force produced by the magnetic attraction between the field system and the unit $1\text{-}_k$ of the speed $V_k$ to forcibly pull the platform toward the unit $1\text{-}_k$ of the speed $V_k$, starts to gradually exceed the restraining force. In this condition, the magnetic attraction acting on the surface of the unit $1\text{-}_{k-1}$ of the speed $V_{k-1}$ and the unit $1\text{-}_k$ of the speed $V_k$ on which the field system is extending, is generally varied in proportion to the area ratio of the unit surfaces or the lengths of the units under the field system. Consequently, when the leading edge of the field system passes through the boundary point x, the tractive force produced by the magnetic attraction acting between the unit $1\text{-}_k$ of the speed $V_k$ and the field system overcomes the restraining force provided by the magnetic attraction acting between the unit 1-$_{k-1}$ of the speed $V_{k-1}$ and the field system, so that the platform is accelerated toward the unit 1-$_{k}$ of the speed $V_k$, and after the field system has completely transferred to the unit 1-$_k$, the platform is synchronized with the speed $V_k$ of the unit 1-$_k$. In this case, by suitably presetting the magnetic attraction by suitably designing the magnetic means of the field system comprising electromagnets or permanent magnets, the speed change which occurs when the platform passes from one to the other of the units having the steplike speed difference shown by the dotted line P can be determined as desired so as to change with a greater acceleration than the previously mentioned curve P′ obtained without the action of any magnetic attraction as shown by a curve $P_1$ in FIG. 6c with respect to the speed differences between the units which change from the speed $V_{k-1}$ to $V_k$ and from $V_k$ to $V_{k+1}$. As a result, within the limits of permissible acceleration to people or goods on the platform, it is possible to accelerate the platform with greater speed changes from $V'_{k+1}$ to $V'_k$ and from $V'_k$ to $V'_{k+1}$ as shown by a curve $P_2$ in FIG. 6c without causing the previously mentioned slipping phenomenon due to the friction, and the speed of the platform can be continuously changed as desired to follow the arbitrarily preset speed changes between the units. Also, by making the belt length of each unit substantially equal to the length of the platform field system, it is possible to move the platform with practically linear speed changes per distance. Namely, in accordance with the present invention, the traveling distance of the platform required for the platform speed to synchronize with the unit speed when passing from one onto another of the conveyor units having different speeds, is not dependent on the length of the platform but dependent on the positional dimension of the field system facing the magnetic belts, and this constitutes a feature of this invention.

While the platform is accelerated in the above-mentioned manner, the deceleration of the platform is accomplished through steps which are entirely contrary to the above-mentioned steps. Thus, the platform travels through the units 1-$_O$ through 1-$_{2n}$, sequentially passing through the first constant speed section, acceleration section, second constant speed section, deceleration section and third constant speed section in this order, and then the platform is returned to the starting point through the units 1′-$_{2n}$ to 1′-$_O$.

On the other hand, in the case shown in FIG. 2b in which the platform is moved along the curved surfaces of the units 1′-$_O$ and 1-$_O$ and the units 1-$_{2n}$ and 1′-$_{2n}$ at the ends of the conveyor line, where the conveyor line involves positional differences in the height or where the accuracy of parallelism between the guide tracks and the belt surface is subject to undulation due to physical reasons, if the platform is of the structure which is rigid in the lengthwise direction, there is the danger of the gap between the field system and the magnetic belt surface of the units becoming greater than the predetermined value thus producing an undesirable effect of reducing the magnetic attraction. To overcome this difficulty, it will be possible to suitably design the interpole distance in the traveling direction of the field system on the lower surface of the platform, the distribution of magnetic attraction acting between the platform and the magnetic belt, the radius of the composite wheels 22-$_O$ and 22′-$_n$ at the ends of the conveyor line in FIGS. 2a and 2b, the coupling angle between the units in the undulated and curved portions, etc., so as to prevent the gap between the field system surface and the magnetic belt surface from exceeding the predetermined value, and another solution will be to form the field system into a flexible structure so that the lower surface of the field system on the lower surface of the platform always face the curve of the belt surface within a predetermined gap therebetween. For example, in FIG. 5 the platform base plate 25 supporting the plurality of magnet means 24 may be made flexible in terms of material or structure in the lengthwise direction and also a universal coupling or flexible filler packing may be placed as a spacer between the magnet means in the lengthwise direction of the platform, thereby making the lower surface of the field system to be bendable as a whole in conformity with the curve of the belt surface. While, in the above-described embodiment, each of the plate platforms arranged along the conveyor line to follow the circulating movement of the magnetic belts is constructed so that the platform is moved by the magnetic attraction produced by the magnet means provided on the platform itself, in the section where the conveyor unit is continuously arranged to move at speeds which are stepwise different from one another, there occurs as a matter of course a change in the acceleration to the passengers or goods on the platform when it is passing one unit onto another, and this may have the danger of causing the passenger to fall from the platform.

Figure 7:
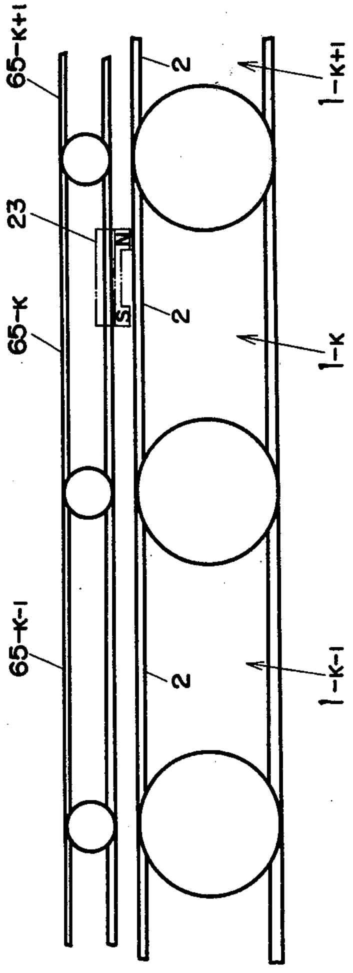
FIG. 7 is a partial side view showing one form of a moving railing.

As a measure of preventing the danger of the passenger falling from the platform, ensuring a feeling of safety for the passengers on the platform or preventing shock to the passengers by any unforeseen accident, a movable railing of the similar belt conveyor structure as the integrator conveyor line may be provided along the latter. In other words, as shown in FIG. 7, such a moving railing may be provided by extending, at least on one side of the platform 23 track surface of the conveyor line forming the integrator, a plurality of belt units 65-$_{k-1}$, 65-$_k$, 65-$_{k+1}$, etc., which are corresponding respectively to the conveyor units 1-$_{k-1}$, 1-$_k$, 1-$_{k+1}$, etc., of the integrator and movable at speeds different from one another but the same with those of the corresponding conveyor units in a multiple-stage continuous arrangement.

Figure 8:
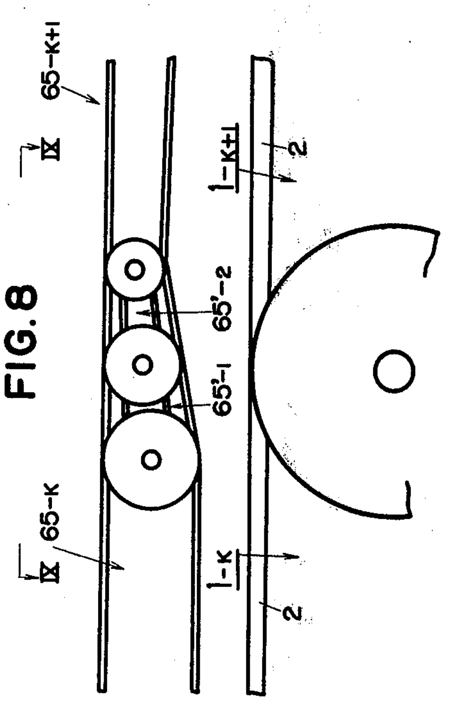
FIG. 8 is a partial enlarged side view showing another form of the moving railing.
Figure 9:
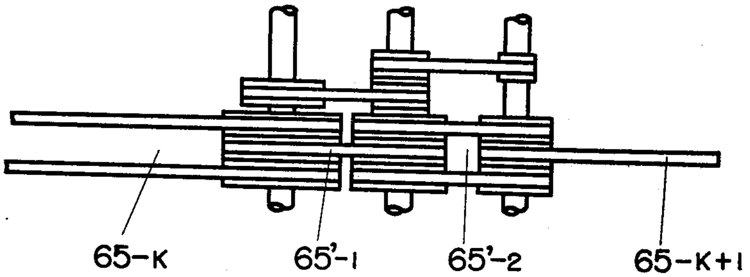
FIG. 9 is a view looked in the direction of the arrow IX—IX in FIG. 8.

In this case, where the adjacent conveyor units are different in speed from each other, the change in the moving speed of the passengers on the platform during its transfer from one conveyor unit to another by the traction of the magnetic attraction has a desired slow speed change as mentioned in connected with the previously described embodiment, and consequently if the moving railing provided along the conveyor units is subjected to the same steplike speed changes as the corresponding conveyor units, there is the danger of causing any undesirable trouble to the passengers depending on the length of the platform field system. Generally, this difference in speed between the moving railing or the belt line and the platform is caused only within the traveling distance which is smaller than the length of the platform field system, and thus this speed difference does not give rise to any serious problem. However, where this speed difference is to be reduced for any reason, as shown in FIGS. 8 and 9, the belt units 65-$_k$ and 65-$_{k+1}$ corresponding respectively to the adjoining conveyor units 1-$_k$ and 1-$_{k+1}$ of different speeds may be made shorter than the length of the corresponding conveyor units 1-$_k$ and 1-$_{k+1}$, and also one or plurality of separate belt units 65′-$_1$ and 65′-$_2$ may be arranged in series between the belt units $65\text{-}_k$ and $65\text{-}_{k+1}$ to be movable at speeds intermediary of the speeds of the belt units $65\text{-}_k$ and $65\text{-}_{k+1}$.

While, in the foregoing description, the outer surfaces of the magnetic belts in the paralleling portion of the conveyor line face upwardly and downwardly for purposes of describing the feature of this invention in distinction from the ordinary case without magnetic attraction, as will be described later, the conveyor line may be constructed so that the driving wheels as well as the idle wheels have their axes positioned within the vertical plane thus causing the outer surface of the magnetic belts to face laterally.

Further, while, in the above-described embodiment, each unit includes a large number of magnetic belts having the same width and arranged with the same spacing, by arranging a large number of these magnetic belts symmetrically with the center line of the conveyor units in the width direction thereof, the platform including the magnet means having the pole width substantially equal to the unit width, may be moved without causing a width-direction shift movement of the platform when it is passing on from one unit to another, and it is also possible to similarly eliminate the occurrence of such width-direction shift movement by sufficiently increasing the number of magnetic belts used or by designing the width of the platform field system smaller than the unit width. In this case, if each conveyor unit is provided with an increased number of magnetic belts, the spacing between the magnetic belts is made narrower with the result that if, for example, the passenger or goods on the platform are dropped on the unit surface for some reason or other, the danger of the passenger having their hands and feet caught by the belts or the goods falling into the gap between the belts will be prevented thus proving effective as a measure for providing extra safety.

In accordance with this invention, the movement of the platform along the magnetic belt surface of each conveyor unit is effected practically in dependence on the magnetic attraction which is produced by the passing through the magnetic belts of the magnetic flux from the field system of the platform, and where the load of the platform is applied to the magnetic belt surface the rate of dependence of the platform movement on the frictional force due to the load may be made negligible by suitably determining the design specification of the magnetic attraction. As a result, in order to prevent the wear of the surface of the platform facing the magnetic belts through its field system (i.e., the platform lower surface) or the magnetic belt surface, particularly the belt surface in the vicinity of the joint between the units of the different speeds due to the surface friction, it may be constructed so that the platform provided with such supporting means as rollers is placed on the belt to cause the lower surface of the platform to contact with the magnetic belt surface a rolling friction or the load of the platform is born by suitable bearing means such as wheels on the guide tracks to thereby maintain between the platform and the magnetic belt surface a small gap of the magnitude which impedes in no way the magnetic attraction.

Figure 10A:
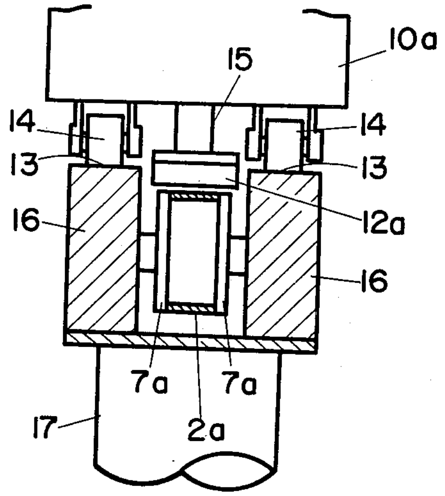
FIG. 10*a* is a front view showing one form of a transportation system according to the invention including a car and its supporting structure.
Figure 10B:
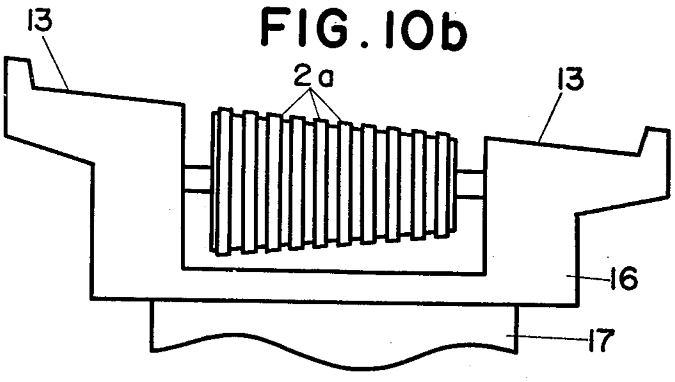
FIG. 10*b* is a front view of the car supporting structure in the curved portion.

For instance, in the case of the arrangement shown in FIGS. 1*a* and 1*b* and FIG. 4, the necessary guide tracks may be provided as shown in FIGS. 10*a* and 10*b*. In FIG. 10*a*, numeral 16 designates supporting girders carried on a supporting post 17 for supporting guide tracks 13, and the guide tracks 13 and a desired number of conveyor units $1_a$, $1_b$, . . . each including a driving unit are mounted on the supporting girders 16. Motors $6_a$, 6*b*, . . . are supplied with power through electric wires (not shown) which are wired through the supporting post 17, and the supporting girders 16 are laid continuously according to the desired layout. Also, connecting belts are provided between the desired conveyor units, thus completing a transportation line as shown in FIG. 11.

Figure 11:
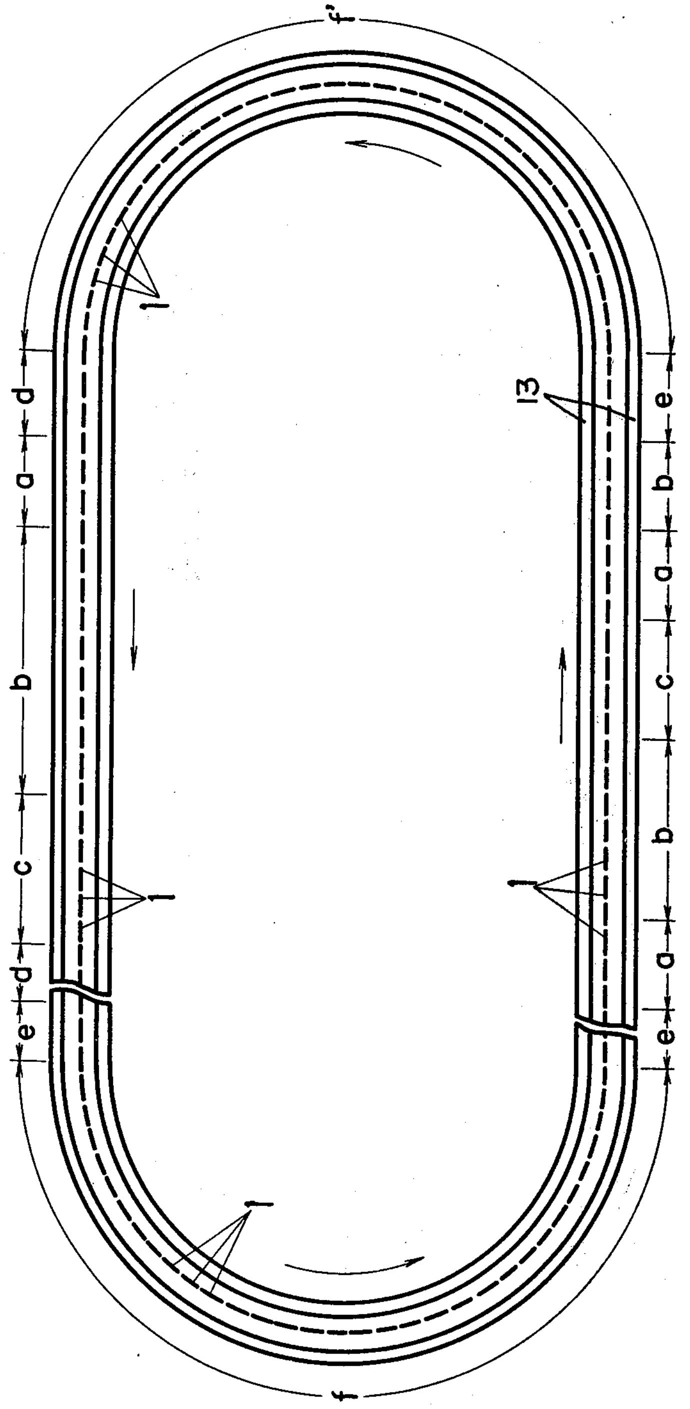
FIG. 11 is a plan view showing one form of the line construction in the transportation system according to the invention.

While the illustrative transportation line shown in FIG. 11 is formed into a horizontal circular track having curved portions, it is needless to say that the track may be modified to include vertically curved portions or graded paths, and if the line is designed for use as a track the transportation of goods only, it may be constructed to describe any desired track including vertical circulating tracks.

While each of the conveyor units singly constitutes a closed-loop, and consequently connecting or transfer belts are provided in the previously mentioned manner to serve a transfer guide belt between the adjoining units, if these transfer belts are comprised of magnetic belts, during the transfer of the car from one unit to another the loss of the magnetic attraction between the car field system and the conveyor unit may be compensated, and by suitably determining the length of the transfer belts (i.e., the distance between the units) and arranging the transfer belts symmetrically with the center line of the field system with respect to the width direction, it is possible to determine as desired the speed change during the transfer of the car from one unit to another and it is also possible to prevent the rolling of the car during a transfer. On the other hand, since the magnetic belts rotate along the peripheral surfaces of the wheels at the ends of the conveyor units, as the car proceeds, a component force acts to pull down the field system at the tail end of the unit and then a component force acts at the fore end of the next unit to relieve the previously mentioned component force thus tending to vertically vibrate the car. However, this vibration is reduced by the transfer belts which support the lower surface of the field system, and the transfer belt may be made from a non-magnetic material if the belts are intended for this purpose only.

If the dimension between the driving wheels and the idle wheels of the conveyor unit is determined suitably, the deflection of the magnetic belt due to its own weight and its thermal expansion and contraction tends to cause vibration in the moving belt. Thus, to minimize the vibration of the belt due to the deflection, as shown in FIG. 4, any desired number of small idle wheels 18 may be provided at suitable spacing in each conveyor unit so as to support the magnetic belt surface or the moving surface. This is necessary not only for the purpose of preventing the deflection of the magnetic belt but also for the purpose of stabilizing the movement of the car at high speeds, since, in FIG. 10*a*, if other conditions are constant, the magnetic attraction acting between the magnetic belt and the field system on the car is greatly dependent on the gap between the field system laid on the lower part of the car through the intermediary of the supporting means 15, and moreover the car is moved mainly by the magnetic attraction.

On the other hand, if the field system 12 which is supported by the supporting means 15 is oscillated by the rolling of the car or by the centrifugal force at the curved portions and thus caused to contact with the edges of the tracks 13 or the inner wall surface of the supporting girders 16 during the running of the car, there is the danger of the field system structure being destroyed along with the supporting means. To overcome this difficulty, it is desirable to form the field system 12 into a circular shape and rotatably mount it on the supporting means 15, mount rolling wheels or rolling rings on the outer periphery of the field system or forming such rolling wheels or the like from an elastic material for shock reducing purposes. Further, as a similar measure in the direction in which the field system approaches and moves away from the belt surface, it is possible to prevent lateral and vertical oscillation of the field system by forming the supporting girder inner walls at the inner edges of the tracks 13 with upwardly spreading inclined faces and rotatably placing balls on the outer periphery of the field system to contact with the inclined faces.

While, in FIG. 11, one embodiment of the invention is shown in the form of a circulating track, this embodiment comprises a conveyor line suitably divided into a variety of sections, namely, an acceleration section a including a desired number of conveyor units 1 continuously arranged according to a desired acceleration pattern, a mixed intermittent acceleration and inertial running section b in which conveyor units 1 are arranged at such spacing that will compensate the running resistance of the cars, a forced constant speed section c in which conveyor units 1 are continuously arranged in accordance with a relatively low constant speed pattern for permitting transfer of people or goods between the line and the previously mentioned integrator, an inertial running deceleration section d in which no conveyor unit is provided, a forced deceleration section e in which conveyor units 1 are arranged continuously according to a deceleration pattern, and curved forced constant speed running sections f and f' in which conveyor units 1 are arranged continuously in a broken line configuration in accordance with a constant speed pattern for relatively low speed running. In other words, in FIG. 11 the cars in the section f travel in the direction of the arrow so that having traveled through the section e by the force of inertia, the cars are accelerated to a desired speed in the section a, in the section b the cars undergo a constant speed movement at an average running speed while being accelerated to compensate only for the deceleration due to the running resistance of the cars, the cars are forcibly maintained at the synchronous speed with the integrator in the section c, are accelerated further in the section a, travel through the section b at a constant speed and are then forcibly decelerated in the section e before reaching the curve, and then the cars travel through the curved section f at a relatively low speed, travel through the inertial running section d and are again accelerated to the predetermined constant speed in the section a. In this way, the cars continuously travel through all the sections in accordance with the predetermined speed pattern without any stop. Further, by utilizing variation of the spacing due to the speeds of the cars formed into a train, the doors of the cars may be automatically opened and closed in the sections c. It is needless to say that the tracks are canted in the curved sections in accordance with the preset speed so that the traveling speed of the cars is always maintained constant at the preset speed throughout the curved sections and the amount of the cant is always maintained correct, thus reducing the effect of the centrifugal force on the cars to a very small level. While this cant has the effect of causing the field systems of the cars to similarly tilt on the curved portions, this difficulty may be overcome by, for example, arranging the conveyor units to tilt in the similar manner as the inclination of the tracks or by using conveyor units in which as shown in FIG. 10*b* the wheel's diameter near the outer side of the bend of the curved portions is increased as compared with that of the wheel on the inner side to form a tapered wheels, and outer surfaces of the magnetic belts passed around the tapered wheels are made even to said cant.

It is to be noted that there is no need to provide the previously mentioned connecting or transfer belts in the sections b where the intermittent acceleration is imparted, and if they are used, they may be of non-magnetic material since there is no need to forcibly control the car speed.

Where the conveyor line is in the form of a circular rotating track as shown in FIG. 11, there is no need to extend the feeder lines for supplying electric power to the field systems along the entire line, and it is sufficient to discontinuously provide the feeder lines at intervals smaller than the length of the train formed by connecting a plurality of cars and provide the train with the current collectors which are common for the individual cars. Particularly, where the train is in the form of a circular train, it is possible to provide the train with a set of feed and return distribution lines which are arranged in the lengthwise direction of the train forming the ring and which are used in common with the cars to supply said power to their field systems, thereby eliminating the need to provide the feeder lines on both sides the conveyor line along the entire length of the track, and it is also possible to provide the feeder lines of a predetermined length at suitable intervals along certain sections of the conveyor lines, such as, the integrator boarding and alighting sections c so that only in these sections current is conducted to the cars from the ground side through the current collectors provided at suitable intervals. It is of course possible to apply the above mentioned method to a train in which a plurality of cars is connected in the ring form as well as a train of any desired length by suitably designing the number of boarding and alighting sections of a continuous transportation system, section distance, train length, amount of expansion and contraction of coupling device, etc.

While, the transportation system shown in FIGS. 2*a*, 2*b*, 3 and 5 is shown in the form of an integrator designed for transfer of passengers or goods to and from a continuous transportation system such as shown in FIGS. 1*a*, 1*b*, 4, 10 and 11, if electromagnets are used for the magnet means of the platform 23, it is of course necessary to provide a current feeding system for the moving objects, and it is also necessary to guide the movement of the platforms along the conveyor line, since it is desirable to arrange so that during the movement of the platforms the pole faces of the platforms are always held close to the magnetic belt surface by being held fast to the magnetic belts or by being opposed to the magnetic belts through a gap of the magnitude which does not impede the effective magnetic attraction.

Figure 12:
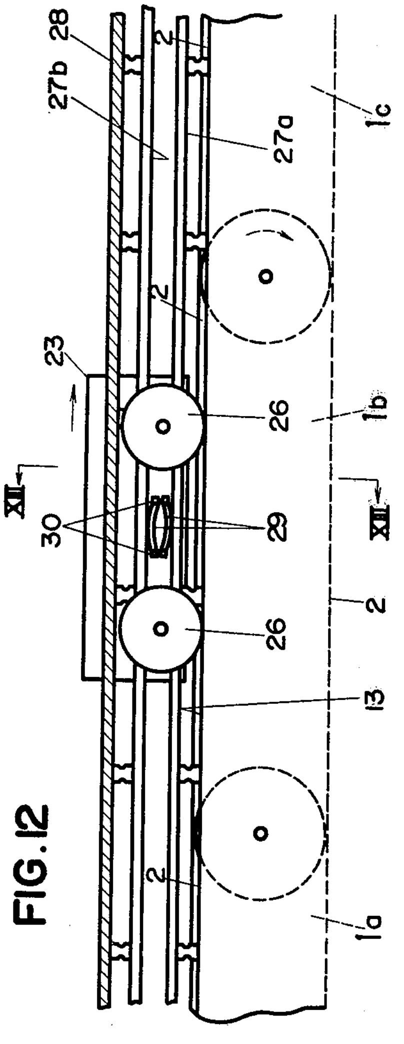
FIG. 12 is a side view showing an embodiment of a moving guide device for the moving member or platform of the transportation system of this invention and the construction of a part of an integrator for continuous transportation system.
Figure 13:
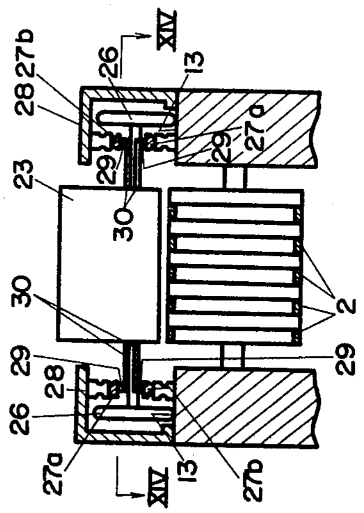
FIG. 13 is a view looked in the direction of the line XIII—XIII of FIG. 12.
Figure 14:
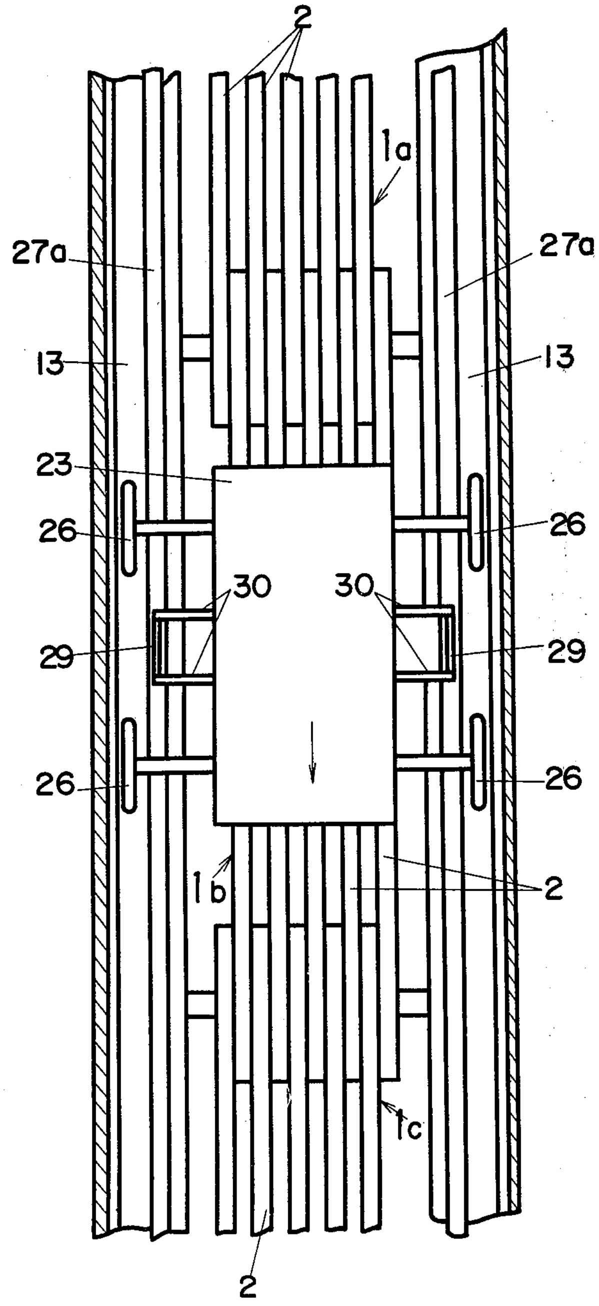
FIG. 14 is a view looked in the direction of the line XIV—XIV of FIG. 13.

FIGS. 12, 13 and 14 show an exemplary form of platform travel guide means which meets these requirements. In the Figures, numerals $1_a$, $1_b$ and $1_c$ designate conveyor units constituting the conveyor line of an integrator, 2 magnetic belts which are independently movable in each conveyor unit, 23 a platform equipped with electromagnets and movable by magnetic attraction along the conveyor line in accordance with the rotation of the magnetic belts. The integrator comprising these component parts has already been described in detail in connection with FIGS. 2*a*, 2*b*, 3 and 5, and therefore it will not be described no further.

The platform 23 includes wheels 26, and guide tracks 13 are laid along the sides of the conveyor line so that the wheels 26 rotate on the tracks 13 to support or suspend the platform load. Since the movement of the platform 23 is effected by the magnetic attraction acting between the magnetic belts and the platform field, it is only necessary for the wheels 26 to serve the purpose of supporting the load of the platform and decreasing the resistance to the movement of the platform in the desired direction, and therefore the wheels 26 need not have any function which ensures adhesion movement of the platform with a rubber frictional force between the platform and the track surface which is greater than a certain value as in the case of the ordinary cars loading the power. Thus, while, in the illustrated embodiment, the platform includes the wheels, the wheels may be replaced with other supporting means such as a sledge which slides over the track surfaces.

Fixedly supported on the upper track surface of the guide tracks 13 are first feeder lines $27_a$ which are insulated, and supporting brackets 28 are provided to project over the track surface. The other insulated feeder lines $27_b$ are fixedly laid on the lower surfaces of the supporting brackets 28 to extend parallel to the feeder lines $27_b$ with a gap therebetween, and electric power is supplied through the feeder lines from a power supply unit which is not shown. The platform 23 is also provided with current collectors 29 which are disposed in the gap b between the paired feeder lines $27_a$ and $27_b$ to electrically contact therewith a suitable contact pressure and to move in sliding contact with the feeder lines $27_a$ and $27_b$ along with the movement of the platform, and in this way the necessary power is supplied through the feeder lines $27_a$ and $27_b$ to the electromagnet means laid in the platform. Each of the current collectors 29 is made from an elastic electrically conducting material and formed with arcuated upper and lower surfaces to ensure smooth sliding movement along with the movement of the platform in either directions, and the current collectors 29 are mechanically connected to the platform and electrically connected to the electromagnet means in the platform through connecting supporting rods 30 and are also provided with a sufficient strength to overcome the resistance force due to the sliding with the feeder lines in response to the movement of the platform. As a result, in this embodiment, as shown in the Figures, the feeder lines provided along one guide track may be used as a supply line for the current to be supplied and the feeder lines on the other guide track as a return line for the current supplied, and at the same time the running resistances on the sides of the platform may be made equal to each other.

The wheels 26 are laid by determining the height of the platform in accordance with the differences in level between the running surfaces of the guide tracks 13 and the magnetic belt upper surface of the conveyor line so that the lower surface of the platform faces the magnetic belt upper surface of the belt to maintain a gap less than a predetermined dimension, and the guide tracks 13 are laid in accordance with the magnetic belt surface so that the said gap dimension is held smaller than a predetermined value over the entire length of the conveyor line, thus allowing the pole faces of the platform to stick fast to the magnetic belts or face the magnetic belts with the gap less than the predetermined dimension at all times over the entire length of the conveyor line. While there will be no possibility of the platform rolling sideways in the width direction of the platform during the running thereof if the width direction center line of the platform is on the center line of the magnetic belts and if the magnetic belt width is within a predetermined field system width, when it is desired to hold such sidewise rolling smaller than a predetermined value by means of the designed specification, it is possible to use flanged wheels and lay rails on the guide tracks so that the wheels may be fitted on and rolled on the rails.

By using electromagnets for the field system of the platform as in the above-mentioned case, it is possible to on-off control the supply of energizing current to the electromagnets to produce and distinguish the magnetic attraction between the electromagnets and the magnetic belts, and in this way the movement of the platform may be stopped and resumed easily through only the on-off control of the energizing current to the electromagnets.

For example, in case a train is well filled so that any passengers on the integrator cannot transfer to the train of the continuous transportation system or when it is not desirable for the passengers to get on the moving platform at the integrator boarding place, it is preferable, from a safety point of view, to temporarily stop the movement of the platform itself at the integrator boarding place rather than inhibiting the boarding and resume the movement of the platform as soon as the need for stopping the movement has disappeared.

Figure 15:
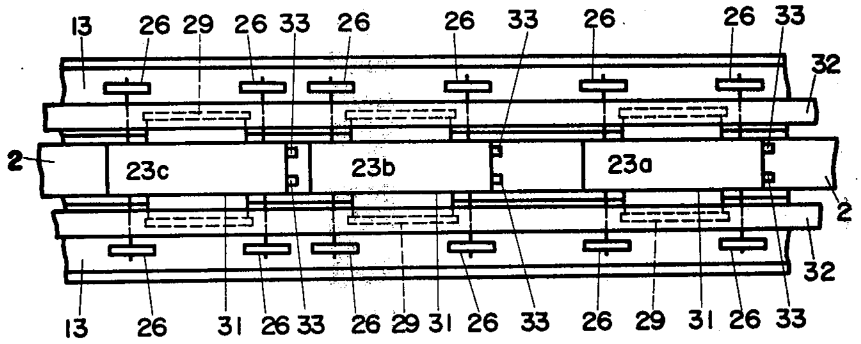
FIG. 15 is a plan view showing a stop mechanism for a platform according to another embodiment.

With the integrator shown in FIG. 15, a plurality of platforms $23_a$, 23*b* and 23*c* each carrying electromagnets are arranged to move along the surface of magnetic belts 2 of a conveyor line including continuously arranged conveyor units by following the circulating movement of the magnetic belts 2 while maintaining therebetween a small enough gap to gain the effective magnetic attraction. Said integrator comprises platform supports 31 including the electromagnets, tracks 13 provided on both sides of the conveyor line, rolling wheels 26 for supporting the platform supports 31 while rolling on the tracks 13 for the purpose of guiding and moving said platform, feeding lines 32 supported through insulators on both sides of the tracks to supply the necessary electric power to the platforms $23_a$, 23*b* and $23_c$, and current collectors 29 equipped on the platform to move in sliding contact with the feeder lines. The movement of the platforms $23_a$, $23_b$ and $23_c$ on this integrator is accomplished in the following manner, namely, the electromagnets of the platforms are energized by the power supplied from the feeder lines 32 through the current collectors 29 and the magnetic flux produced by the resulting electromagnetic fields pass through the magnetic belts moving at a constant speed level, thus producing magnetic attraction therebetween and thereby causing the platforms to be moved by being forcibly pulled by the magnetic attraction to follow the movement of the magnetic belts 2. Consequently, even if the power is being supplied to the platforms, if the energizing circuit for the electromagnets is cut, no electromagnetic force is produced and thus the platforms do not travel along with the movement of the magnetic belts 2. Since the movement of the platform is accomplished automatically in accordance with the speeds of the magnetic belts 2, the switching on and off of the energizing circuits in the platforms per se must be effected externally or, alternately, the on-off operation of the energizing circuits must be effected according to the mechanical conditions due to the running conditions of the platforms per se. Thus, in order to stop and resume the movement of the platforms through the on-off control of the energizing circuits thereof, a contactor 33 is equipped on one side or both sides of the traveling direction front part of each platform, and each contactor 33 incorporates a spring switch mechanism which is adapted to operate at a predetermined contact pressure when the contactor of the following platform contacts with the tail end of the preceding platform due to its deceleration or stopping, thus cutting off the electromagnet energizing circuit of the following platform. When the movement of the preceding platform is resumed so that there is no longer any contact pressure, the contactor 33 is released, and the energizing circuit of the following platform is turned on. The contactor 33 may be replaced with a proximity switch which comes into operation when the following platform approaches the preceding platform.

In FIG. 15, when the platform $23_a$ is stopping in the low speed section which is the passenger boarding place and the following platform $23_b$ is in contact with the preceding platform $23_a$, the contactor 33 of the following platform $23_b$ comes into operation and cuts its electromagnet energizing circuit off. When this occurs, the magnetic attraction acting between the magnetic belts 2 and the electromagnets is rapidly reduced to zero and there is no longer any force acting to forcibly move the platform. Consequently, the inertia of the platform $23_b$ is cancelled by the running resistance between the rolling wheels 26 of the platform and the tracks 13 and the sliding resistance between the current collectors 29 and the feeder lines, and the following platform $23_b$ comes to a stop. The next platform $23_c$ also comes to a stop in the similar manner. When the movement of the preceding platform $23_a$ is resumed so that there is no longer any contact between the platforms, the contractor 33 of the platform $23_b$ is released so that its energizing circuit is turned on and the electromagnets are energized, thus restoring the magnetic attraction and thereby resuming the movement of the following platform $23_b$ in succession to the preceding platform $23_a$.

Figure 16:
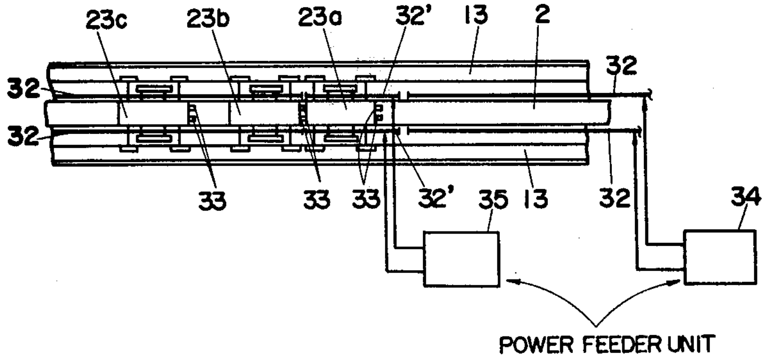
FIG. 16 is a plan view showing a stop mechanism for a platform according to still another embodiment.

With the integrator provided according to the invention, in addition to the stopping and restarting of the platforms relative to one another on the integrator, the operation of the platforms at the integrator boarding places may be accomplished by suitable means which utilizes changes in the traffic volume on the continuous transportation system, e.g., information on the passengers on the cars of the continuous transportation system. In other words, in the case when the cars are well filled, as it is impossible for the passengers to transfer to the cars from the integrator, the operation of the platform at the integrator boarding place is stopped. As shown in FIG. 16, separate feeder lines 32' are provided independently of the other feeder lines 32 only in the desired platform boarding place sections or the integrator boarding places, and these feeder lines 32' are connected to a feeding unit 35 which serves as a separate power source for supplying power in accordance with the information on passenger independently of another feeder unit 34 for the feeder lines 31. With the power supply to the feeder lines 32' being switched off by the feeder unit 35, the power is not supplied through the current collectors to the field system of the platform coming into the section provided with the feeder lines 32', with the result that the electromagnetic field produced by the electromagnets of the platform is distinguished and no magnetic attraction acts to forcibly move the platform along with the movement of the magnetic belts 2, thus stopping the platform in the section with the feeder lines 32'. Now, when the feeder unit 35 is turned off so that the platform $23_a$ is stopped in the section with the feeder lines 32', the following platform $23_b$ comes into contact with the preceding platform $23_a$ and the resulting actuation of the contactor 33 opens the energizing circuit of the platform $23_b$, thus bringing it to a stop. This is the same with the platform $23_c$ following the platform $23_b$, and consequently the stopping of the platform $23_a$ in the section with the feeder lines 32' causes the succeeding platforms $23_b$, $23_c$, . . . to stop in succession. When it is desired to resume the movement of the platform $23_a$, the feeder unit 35 is turned on, and power is supplied to the feeder lines 32'. Consequently, magnetic attraction is produced by the electromagnetic field of the platform $23_a$ and the magnetic belts 2, and the platform $23_a$ is started to move again along with the movement of the magnetic belts 2. When the platform $23_a$ is restarted so that it is separated from the following platform $23_b$, the contactors 33 of the following platform $23_b$ are released and its energizing circuit is turned on, thus causing the following platform $23_b$ to start moving again in succession to the preceding platform $23_a$. In this case, since the feeder unit 35 is now turned on, the following platform $23_b$ coming into the section with the feeder lines 32' is not stopped and it moves on along with the movement of the magnetic belts 2. In this way, when the platform $23_a$ stopping in the section with the feeder lines 32 is started moving again, the following platforms $23_b$, $23_c$, . . . at rest also start moving again automatically and sequentially with the predetermined delay times.

In the course of this sequential restarting of the platforms, if the following platform comes into contact with the preceding platform for some reason or other, the contactors of the following platform are actuated so that the electromagnet energizing curcuit of the following platform is turned off irrespective of the energization of the feeder lines, and the following platform is stopped. On the other hand, since the feeder unit 35 for the feeder lines 32' provided at the integrator boarding place is independent of the feeder unit 34 for the other feeder lines 32, the switching on and off of the power supply by the turning on and off of the feeder unit 35 has no effect on the other sections with the feeder lines 32 and hence on the platforms moving in the sections with the feeder lines 32.

The on-off control of the feeder unit 35 for the feeder lines 32' in accordance with changes in the traffic volume on the continuous transportation system, may be suitably accomplished by supplying various running patterns utilizing the information on passengers.

With another embodiment of the integrator for continuous transportation system, a platform changing operation must be performed to remove the platforms to be checked or the platforms whose electromagnets or field systems have lost ability to produce a magnetic field due to failure and to replace into the line the platforms which have been repaired or checked. Where the conveyor line constituting the integrator track is in the form of a circulating closed loop in a vertical plane as shown in FIG. 2*b*, tracks are provided in the lower part of the loop or the return line so that the platform may be held in place against the gravity by its wheels in addition to the magnetic attraction. In this case, since the platform is suspended in the inverted condition from the tracks by means of its wheels in the return line, the platform is held between the tracks and the conveyor line above the tracks, thus making its replacement operation difficult.

Figure 17:
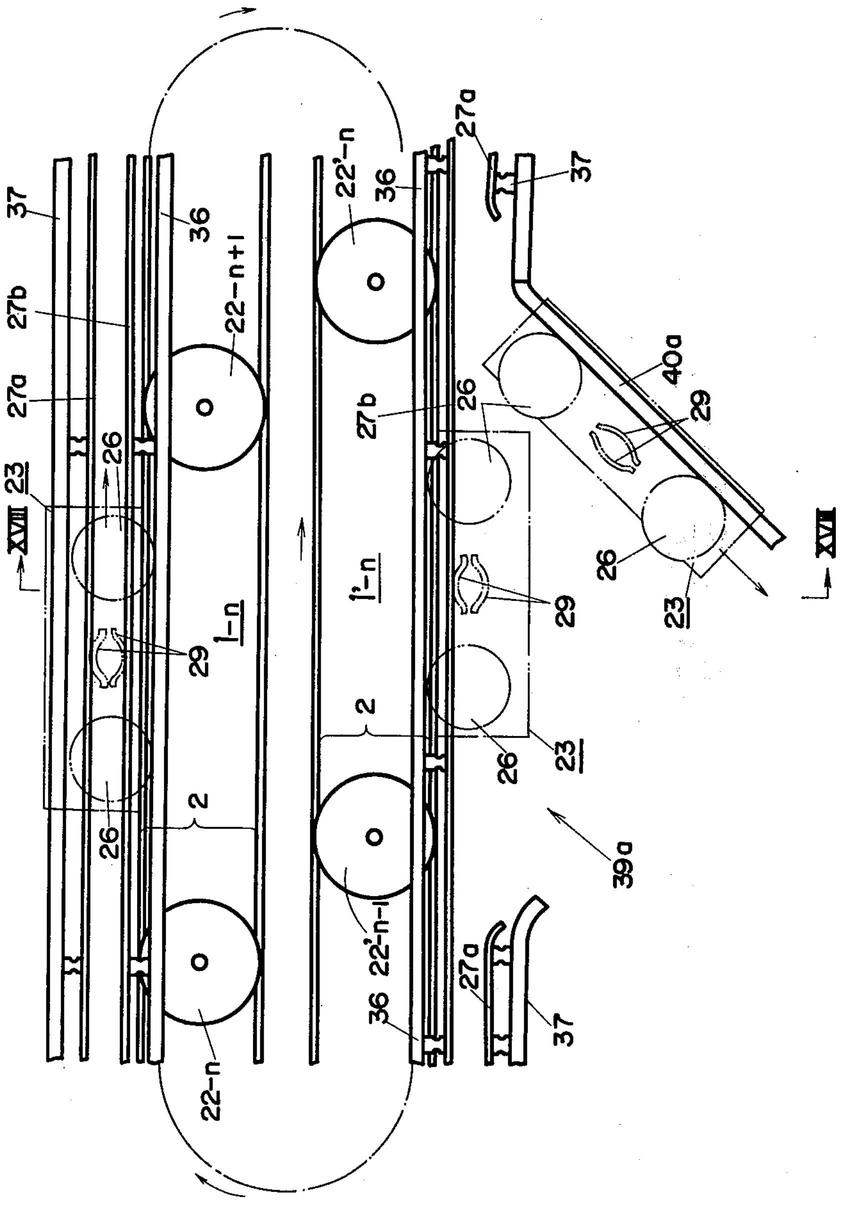
FIG. 17 is a side view of another embodiment showing a partially enlarged view of the conveyor line in FIG. 2*b*.
Figure 18:
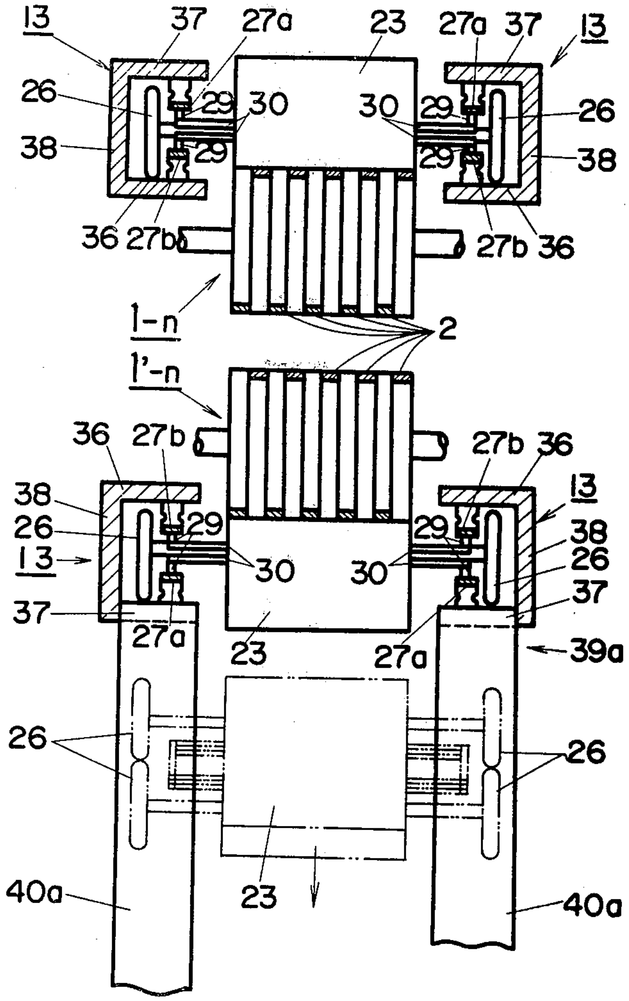
FIG. 18 is a view looked in the direction of the line XVIII—XVIII of FIG. 17.
Figure 19:
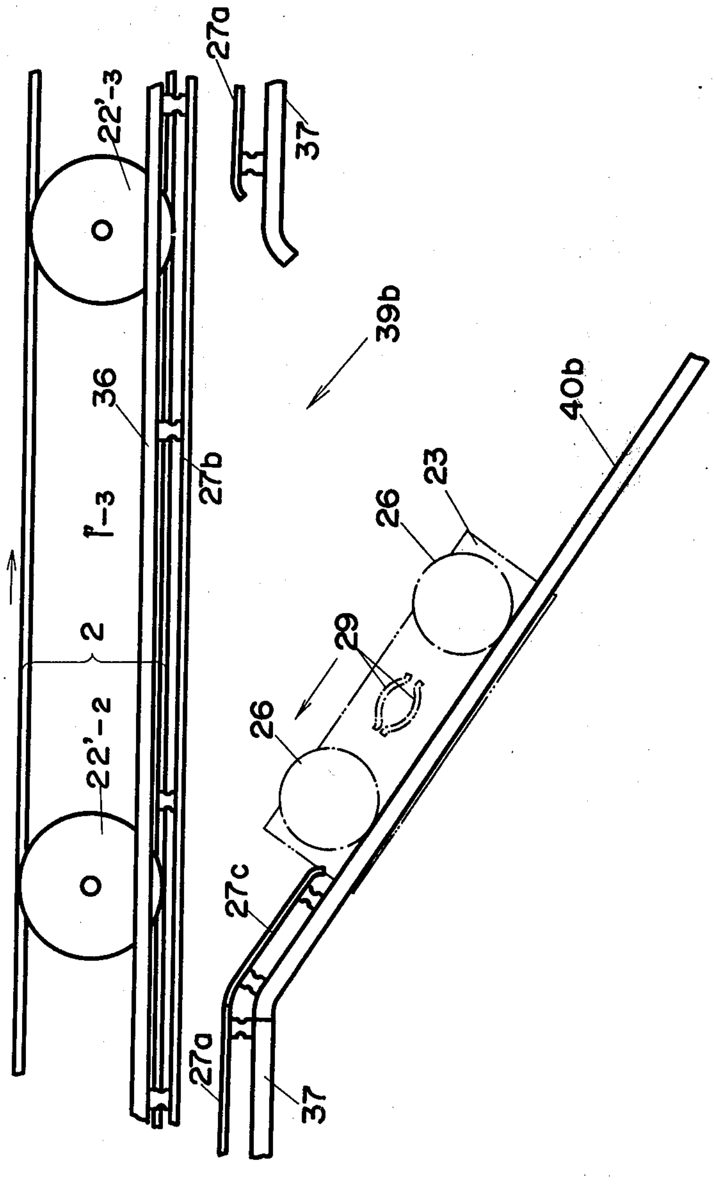
FIG. 19 is a side view similar to FIG. 17, showing another part of FIG. 2*b* in enlarged form.

To make sure replacement operation of the platform possible, a mechanism as shown in FIGS. 17, 18 and 19 is provided in the return line of the conveyor line. FIGS. 17 and 19 are partial enlarged views similar to FIG. 2*b*, and FIG. 18 is a view looked in the direction of the line XVIII—XVIII of FIG. 17.

As mentioned previously, each platform 23 is provided with wheels 26, and guide tracks 13 are laid along both sides of the magnetic belt surface of the conveyor line in the similar circular form as the conveyor line so as to guide the movement of the platform by the rolling motion of the wheels, whereby the platform is supported on the tracks 13 by the wheels 26 in the previously mentioned sections, and the platform is suspended from the tracks 13 by the wheels 26 in the return line. Each guide track 13 comprises a first web 36 forming the rolling surface of the wheel 26 in the sections of the conveyor line and a second web 37 forming the rolling surface in the return line, and these webs are arranged to oppose each other in a vertically parallel relation. The webs 36 and 37 are connected by flanges 38 to provide a pair of channel rails in which are laid parallel two-wire type feeder lines $27_a$ and $27_b$ for supplying electric power to the field system in the platform 23, and the platform 23 further includes connecting supporting rods 30 for supporting in place current collector 29 having arcuated sliding surfaces so as to be pressed and slide between the feeder lines.

In the illustrated embodiment, to facilitate the removal of the platform in the return line for the purposes of check or repair, in the conveyor unit $1'$-$_n$ portion the webs 37 of the guide tracks 13 are provided with a cutout portion $39_a$ for removing the platform 23, and in the conveyor unit $1'$-$_3$ portion the webs 37 are formed with a cutout portion $39_b$ for receiving the sound platform 23 which has been repaired, for example. In the cutout portion $39_a$ inclined guide tracks $40_a$ are connected to the right-hand web end, while in the cutout portion $39_b$ inclined guide tracks $40_b$ are connected to the left-hand web end, and the lower ends of the inclined guide tracks $40_a$ and $40_b$ are connected respectively to a repair space and a storage space. In this case, it will be needless to say that while one of the two-line type feeder lines or the lower feeder lines $27_a$ are cut as the cutout portions $39_a$ and $39_b$, the other feeder lines $27_b$ ensure the supply of power to the platform, and moreover any reduction in the power supply may be eliminated by providing suitable connections to the power source (not shown). In the introducing cutout portion $39_b$, introduction auxiliary feeder lines $27_c$ may advantageously be connected to the feeder lines $27_a$.

With the construction described above, when the circulating platforms 23 pass on through the various sections, come into the return line and reach the cutout portion $39_a$ while moving in the inverted condition, any platform whose field system has lost its ability to produce a magnetic field due to a fault or the like, still rolls on by the wheels on the webs 37 owing to the residual magnetism or by being pushed by the following platform until it reaches the cutout portion $39_a$ where the magnetic attraction between the field system of the platform and the magnetic belts 2 is reduced to zero and the platform rolls down by its own weight onto the inclined guide tracks $40_a$ and automatically reaches the repair space. On the other hand, the normal platforms are still supplied with power from the one feeder lines $27_b$ and the platforms are moved through the return line while being held fast to the magnetic belts 2 by the magnetic flux from the field systems. In this case, if, for example, the feeder lines $27_a$ and $27_b$ in the front of the cutout portion $39_a$ are divided into separate sections so that the supply of power to the feeder lines may be selectively stopped, it is possible to deliver the normal platforms onto the inclined guide tracks $40_a$. To place the platforms which have been repaired or additional sound platforms onto the return line, the sound platforms may be pushed onto the line through the inclined guide tracks $40_b$ at the cutout portion $39_b$ or the guide tracks may be replaced with a belt conveyor having a suitable inclined angle. In this case, when the field system is supplied with power from the auxiliary feeder lines $27_c$ through the current collectors 29, the field system produces magnetic flux and the platform and the magnetic belts 2 attract each other, thus facilitating the introduction of the platform.

While, in the embodiments described in detail with reference to the drawings, the axes of the driving and idle wheels of the conveyor units are arranged horizontally and parallel to one another and the upper and lower belt surfaces of the units are utilized to form a conveyor line, in accordance with the present invention, noting the fact that the direction of movement of the two belt surfaces of the conveyor units are opposite to each other, it is possible to provide a transportation system which is highly versatile in that, as for example, a single conveyor line provides a circulating round track with each end forming a turning point for traveling cars, and branch tracks or the like may be easily provided and there is no need to cant the belt conveyor of the track at the curves.

More specifically, each conveyor unit includes a magnetic belt which is passed around a pair of driving wheel and idle wheel arranged parallel to each other in a vertical plane so as to cause the magnetic belt to move therearound with its belt surface positioned vertically, and a plurality of such conveyor units are arranged in a lengthwise direction in accordance with a desired layout to form a conveyor line, whereby a moving object or objects with magnet means for producing magnetic attraction with the magnetic belts are moved over tracks provided along the belt surfaces on both sides of the conveyor line by the action of magnetic attraction to follow the movement of the magnetic belts.

Figure 20:
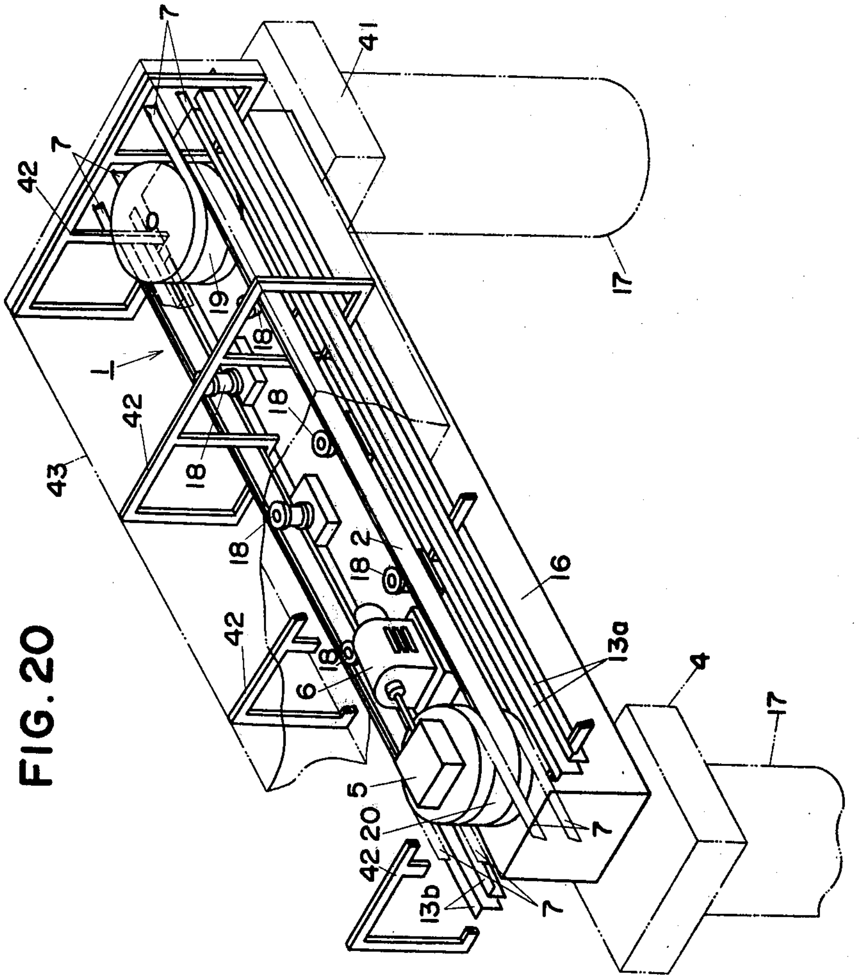
FIG. 20 is a perspective view showing a basic component unit of a transportation system according to still another embodiment of the invention.

FIG. 20 shows a perspective view schematically showing a single component unit of a continuous transportation system according to this embodiment. In the Figure, a plurality of supporting posts 17 are arranged at predetermined intervals, and a supporting girder 16 is supported on the posts 17 through supporting stands 41 as well as supporting shoes, etc., which are not shown, and disposed on the supporting girder is a conveyor unit 1 having a magnetic belt 2 which is passed around a driving wheel 20 and an idle wheel 19 to move therearound in a horizontal plane with the belt surface being positioned vertically. A desired number of supporting girders 16 and conveyor units 1 are continuously arranged along the track in the lengthwise direction, and preferably connecting or transfer belts 7 are passed around the driving and idle wheels of the adjoining conveyor units. The transfer belts 7 serve as guide and support means for the magnet means (field system) of the cars that will be described later when the magnet means passes from one conveyor unit to next one, and another purpose of the transfer belts 7 is to change the speed of the cars not in a steplike manner but in a substantially linear manner in proportion to the traveling distance when the car is passed over the adjoining conveyor units having different speed level each other, i.e., in the forced positive and negative acceleration sections. Thus, these belts 7 need not be magnetic belts in such sections as the inertial running sections b shown in FIG. 11.

The driving wheel 20 of the conveyor unit 1 is driven from a drive motor 6 through a power transmission unit 5 so that the magnetic belt of each unit is moved independently, and a plurality of small idle wheels 18 are laid to maintain the circulating loop of the magnetic belt 2 in a predetermined configuration between the driving wheel 20 and idle wheel 19.

With the conveyor line formed by continuously arranging the conveyor units 1 along the track in the above-mentioned manner, by controlling the operation of the drive motor 6 for each unit, it is possible to obtain an independent speed level for each unit and thus it is possible to preset the speed pattern of the entire conveyor line as desired.

Guide tracks $13_a$ and $13_b$ are supported by supporting frames 42 in place on both sides of the conveyor units 1 to extend along the continuously arranged supporting girders 16 carrying thereon the conveyor units 1, and the two guide tracks $13_a$ and $13_b$ respectively provide an up line and a down line. Since the conveyor line is composed of the supporting girder units, it is possible to adapt construction method in which a desired number of unitized prefabrication conveyor units each including a supporting girder unit, a drive unit, feeder lines and car traveling guide tracks are fabricated in a factory and these conveyor units are successively fixedly mounted in place on supporting posts 17 and stands 41 already laid on a construction site. In the Figure, numeral 43 designates an outer cover placed over the supporting frames 42. As illustrated in FIG. 11 by way of example, the conveyor line or the track of the continuous transportation system includes a free deceleration section or inertial running section in which there is no conveyor units having the magnetic belts passed around the wheels and sections in which the conveyor units having the magnetic belts passed around the wheels are interconnected by the transfer belts to form a continuous conveyor line. With the conveyor line of this embodiment comprising the prefabrication conveyor unit devices, only the supporting girders 16 with the guide tracks but having no conveyor units, drive motors, speed changers, etc., may be laid in those sections requiring no conveyor units, and to interconnect the conveyor units by the transfer belts, it is possible to firstly mount the prefabrication unit devices continuously on the supporting posts and then fit split-type transfer belts between the driving and idle wheels of the adjoining units. Of course, whether magnetic belts or non-magnetic belts should be used for the split-type transfer belts may be determined according to the design specification.

Figure 21:
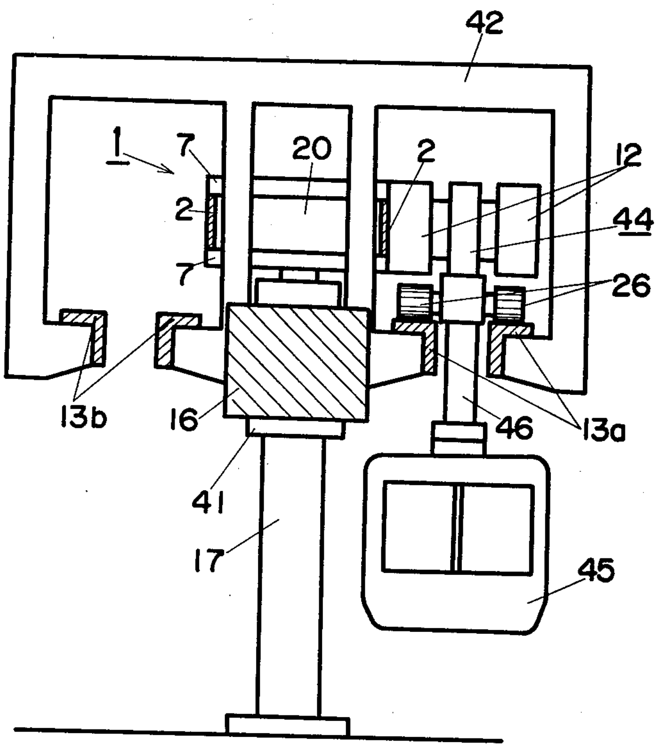
FIG. 21 is a cross-sectional view of FIG. 20.

The conveyor line in which the tracks $13_a$ and $13_b$ of the supporting girders are connected in a series and the conveyor units are laid in the necessary sections in the above-mentioned manner, provides a traveling track for the cars of a continuous transportation system which is laid according to a desired layout. In FIG. 21 there is illustrated one form of such car, namely, a capsule 45 is suspended by a suspension device 46 from a track 44 having field systems 12 and adapted to roll over the tracks $13_a$ and $13_b$ by its wheels 26. However, various modifications are possible. For example, the car capsule 45 may be mounted on the tracks by the truck 44.

Figure 22:
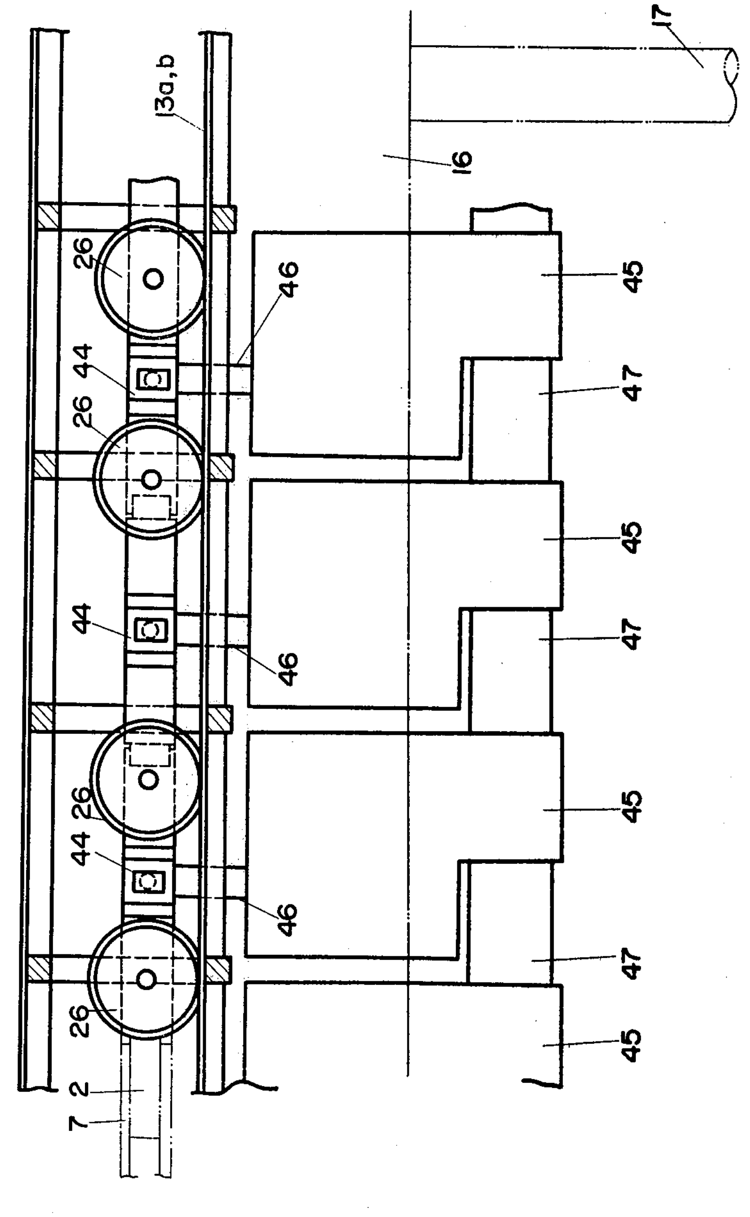
FIG. 22 is a partial side view of FIG. 20, showing the movement of the cars.

With this embodiment, when a plurality of field systems are moving as a unit with a spacing or dimension greater than the spacing of the units, that is, when a plurality of cars are operated in the form of a train as shown in FIG. 22, there is no possibility of the cars stopping so far as any one of the field systems is magnetically attracting the magnetic belts. In this case, the transfer belts need not be magnetic belts, and it is also possible to eliminate the transfer belts per se. In such case, as shown in FIG. 22, it is preferable to interconnect the transport capsules 45 by a coupling device 47 having a vibration preventing function, and it is also preferable to rotatably interconnect the trucks 44.

With the transportation system according to this embodiment, many different types of layouts are possible as shown in FIGS. 23, 24, 25, 26 and 27.

In other words, in FIG. 23 there is illustrated the most simple type of straight-line two-way track, namely, a plurality of the conveyor units 1 are continuously arranged through the connecting or transfer belts 7 into a straight-line track of a desired length. The cars 45 travel along the conveyor line and around the ends thereof, and thus the outgoing and return lines are provided on the sides of the conveyor line.

FIG. 24 shows another layout in which the conveyor units 1 are arranged by the transfer belts 7 in the form of a broken-line track, and this arrangement is well suited for providing a track involving a line curved in a desired direction as well as a circular line of any desired radius in which the centrifugal force acting on the cars can be suitably controlled even if the car speed is maintained higher than a predetermined value.

FIG. 25 shows an exemplary arrangement of the junction point for conveyor lines $48_a$ and $48_b$ comprising the conveyor, and in this case the cars are provided, as shown in FIG. 18, with a field system on each side thereof in the direction of travel and the field systems are selectively energized one at a time to magnetically attract the selected magnetic belts and thereby pass onto the desired line. In other words, the cars traveling on the right side of the conveyor line $48_a$ from the leftward may be transferred to move on along the left side of the line $48_b$ by switching the energization of their field systems from the left-hand field systems to the right-hand field systems at a point where the lines $48_a$ and $48_b$ run parallel to each other and thereby magnetically attracting the magnetic belt of the conveyor line $48_a$. If the energization of the field systems is not switched thus continuously energizing the left-hand field systems, the cars move on along the line $48_a$. On the other hand, the cars traveling on the left side of the line $48_b$ may be transferred to the line $48_a$ by continuing the energization of the right-hand field systems until the cars reach a point where the lines $48_a$ and $48_b$ run parallel to each other and switching at that time the energization of the field systems to the left-hand field systems.

While, the above-mentioned branching and merging of different lines may be accomplished, as a matter of principle, by simply approaching the two lines to each other without causing the lines to run parallel as the lines $48_a$ and $48_b$ shown in FIG. 25, it is in practice desirable to arrange the lines so that the magnetic belts of the two lines run parallel to each other for some length to provide some time necessary to effect the switching in the energization of the field systems.

FIG. 26 shows an arrangement in which the continuous line of the conveyor units 1 and the transfer belts 7 includes a discontinuous portion which is connected by means of a connecting or transfer conveyor line $\mathbf{48}_c$. Thus, in the similar manner as described previously, the selective shutting operation of cars may be accomplished in a portion of a long line by causing the cars traveling on the right side of a line $\mathbf{48}_{a\text{-}1}$ from an upper leftward to move back onto the return line of the line $\mathbf{48}_{a\text{-}1}$ as shown by an arrow $\mathbf{49}_a$ or, alternately, the cars may be caused to pass onto a line $\mathbf{48}_{a\text{-}2}$ along the left side of the transfer line $\mathbf{48}_c$ as shown by an arrow $\mathbf{49}_b$.

Figure 27:
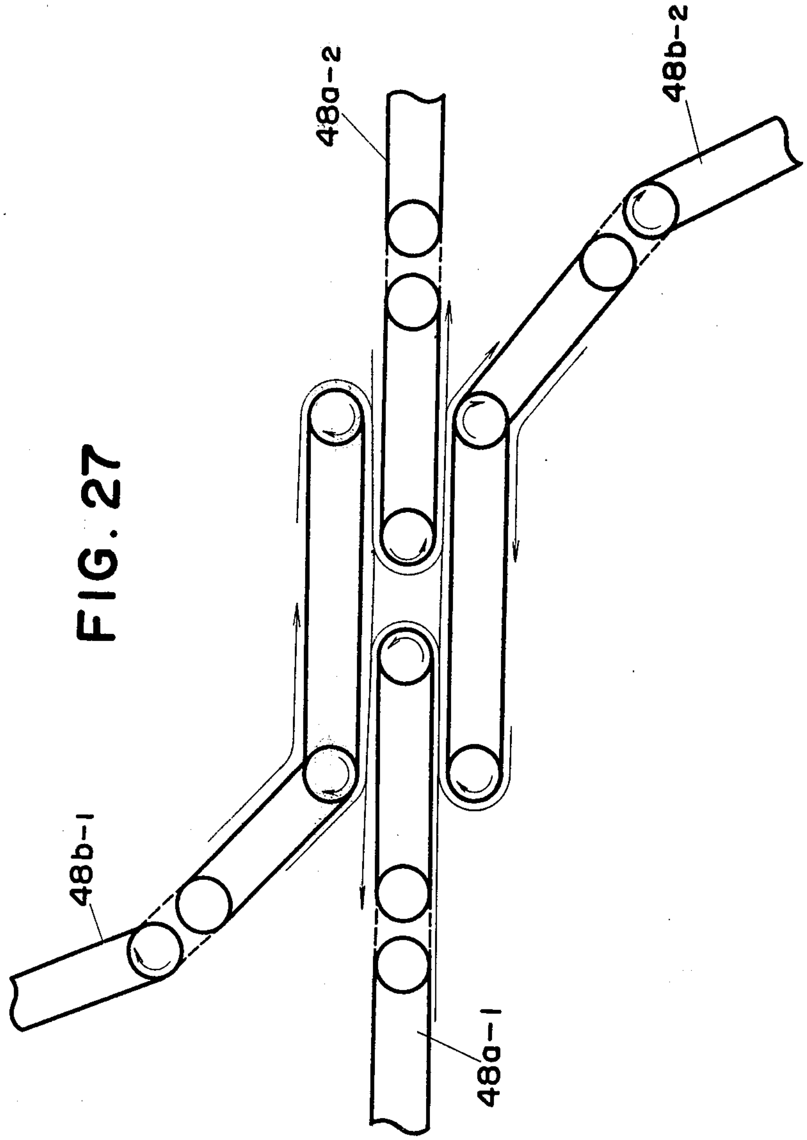
FIG. 27 is similar to FIG. 23 showing another arrangement of the conveyor lines.

FIG. 27 shows an exemplary form of a so-called intersection or a place where conveyor lines $\mathbf{48}_{a\text{-}1}$, $\mathbf{48}_{a\text{-}2}$, $\mathbf{48}_{b\text{-}1}$ and $\mathbf{48}_{b\text{-}2}$ can meet or diverge, and the lines are capable of moving the cars back into the return lines of their own or moving the cars right onto other lines by freely changing the traveling direction of the cars as shown by the arrows in the Figure through the previously mentioned switching in the energization of the right and left field systems.

While, in the above-mentioned embodiments, the line on one belt surface is used as an outgoing line and the line on the other belt surface which is reversed at the driving wheel as a return line and the change of traveling direction between the outgoing and return lines is effected by the arcuate surface at each end of the line, since the curvature of the arcuate surface is practically determined by the outer diameter of the driving wheel of the conveyor unit at each end of the conveyor line, the conveyor line must be provided at each end with a conveyor unit structure which ensures a sufficiently large curvature so that the centrifugal force acting on the cars moving around the arcuate surface is reduced, and this is necessary for ensuring a smooth operation of the cars moving around the arcuated ends of the line.

In other words, in order to reduce the centrifugal force acting on the cars during travel around the ends of the conveyor line while maintaining the traveling speed of the cars above a predetermined value, it is desirable to provide at each end of the conveyor line a large-diameter section around which a magnetic belt is passed with a greater diameter than the diameter of the driving wheel in the conveyor unit at each end of the line.

This large-diameter section may be provided by passing a magnetic belt around the driving wheel of the conveyor unit at the line end and an idle wheel having a larger diameter and forming a circular line, by arranging a plurality of multiple-belt type conveyor units in a ring form with their driving wheels mounted on the common shaft and connecting to the conveyor unit at the line end, or by passing a magnetic belt around a plurality of small idle wheels which are arranged to provide a desired curvature.

Figure 28:
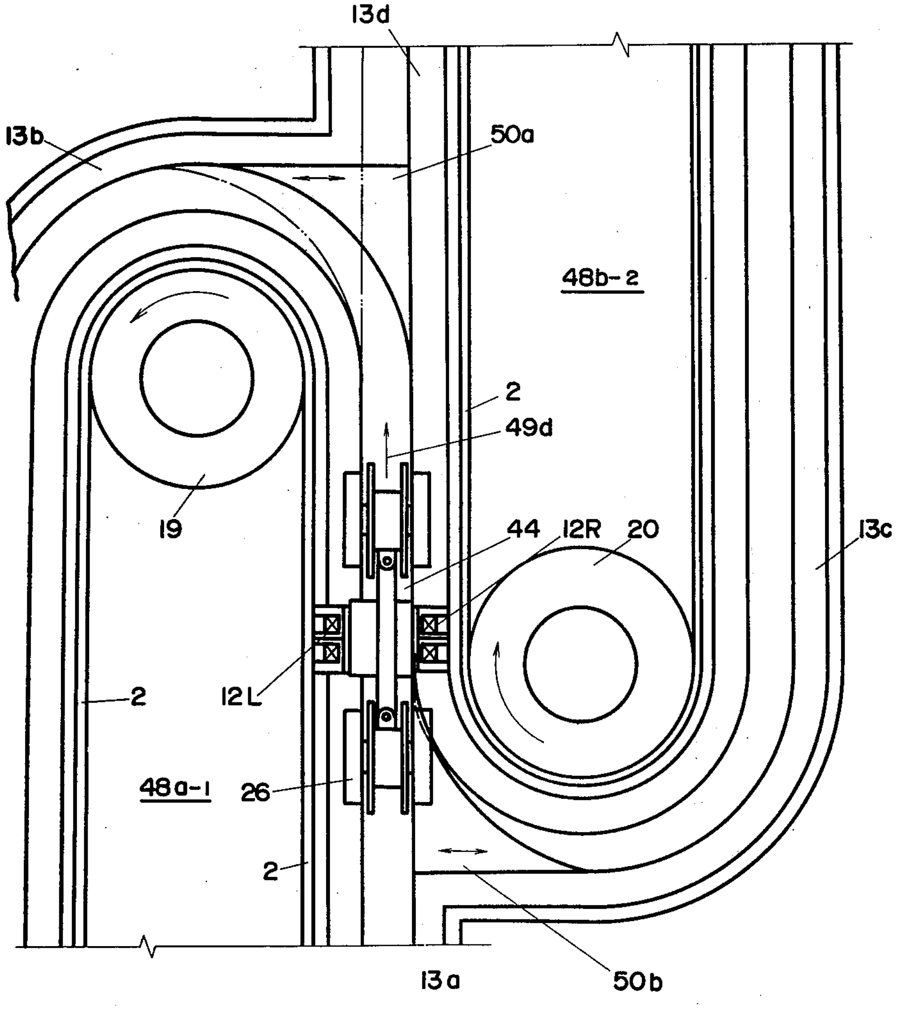
FIG. 28 is a partial enlarged plan view of FIG. 27.

FIG. 28 shows on an enlarge scale the movement of the car or the truck 44 in a section where the two lines run parallel to each other, and switches (points) $\mathbf{50}_a$ and $\mathbf{50}_b$ are provided respectively at the entry and exit of the parallel section for traveling guide tracks $\mathbf{13}_a$, $\mathbf{13}_b$, $\mathbf{13}_c$ and $\mathbf{13}_d$ to determine the traveling direction of the truck 44. Preferably the operation of the switches is controlled so as to be interlocked with the switching in the energization of a left-hand field system $\mathbf{12}_L$ and a right-hand field system $\mathbf{12}_R$ which are mounted on the truck 44. While, in FIG. 28, the pair of field systems $\mathbf{12}_L$ and $\mathbf{12}_R$ are connected back-to-back at the yokes thereof, the left-hand field system $\mathbf{12}_L$ and the right-hand field system $\mathbf{12}_R$ may be mounted to be staggered in the longitudinal direction of the truck 44 or the field systems may be arranged alternately in a line with their pole faces facing in opposite directions.

In FIG. 28, the truck 44 traveling on the tracks $\mathbf{13}_a$ in the direction of an arrow $\mathbf{49}_d$ is guided into the parallel section of the two lines by the magnetic attraction between the magnetic belt 2 surface on the right side of the conveyor line $\mathbf{48}_{a\text{-}1}$ and the left-hand field system $\mathbf{12}_L$. When it is desired to move on along the tracks $\mathbf{13}_b$ and transfer to the return line of the line $\mathbf{48}_{a\text{-}1}$, the switch $\mathbf{50}_a$ is moved from its dotted line position to its solid line position thus connecting the tracks $\mathbf{13}_a$ to the tracks $\mathbf{13}_b$, and the field system $\mathbf{12}_L$ is kept energized thus causing the truck 44 to follow the movement of the magnetic belt 2 of the line $\mathbf{48}_{a\text{-}1}$ by the magnetic attraction and transfer from the tracks $\mathbf{13}_a$ to the tracks $\mathbf{13}_b$. To cause the truck 44 to travel right onto the tracks $\mathbf{13}_d$ through the tracks $\mathbf{13}_a$, the switch $\mathbf{50}_a$ is moved from the solid line position to the dotted line position to connect the tracks $\mathbf{13}_a$ to the tracks $\mathbf{13}_d$ and the energization is switched from the field system $\mathbf{12}_L$ to the field system $\mathbf{12}_R$. When this occurs, the field system $\mathbf{12}_L$ is separated from the magnetic belt 2 of the line $\mathbf{48}_{a\text{-}1}$ and the field system $\mathbf{12}_R$ is magnetically attracted with the magnetic belt 2 of the line $\mathbf{48}_{b\text{-}2}$, thus causing the truck 44 to follow the movement of the magnetic belt by the magnetic attraction on the left side of the line $\mathbf{48}_{b\text{-}2}$ and transfer to the tracks $\mathbf{13}_d$. Of course, the truck traveling on the tracks $\mathbf{13}_c$ on the right side of the line $\mathbf{48}_{b\text{-}2}$ may be led into the parallel section by moving the switch $\mathbf{50}_b$ to the left in the illustration, and thereafter the truck may be transferred to either the tracks $\mathbf{13}_b$ or the tracks $\mathbf{13}_d$ by the similar operation as mentioned previously. Since the switches $\mathbf{50}_a$ and $\mathbf{50}_b$ are provided to switch the openings for passing the suspension device 46 from which the capsule 45 is hung, in the case of a car having a capsule mounted on its truck there is no need to use any switch, and the truck may be transferred from one set of tracks to another by simply switching the energization between the right and left field systems.

Figure 29:
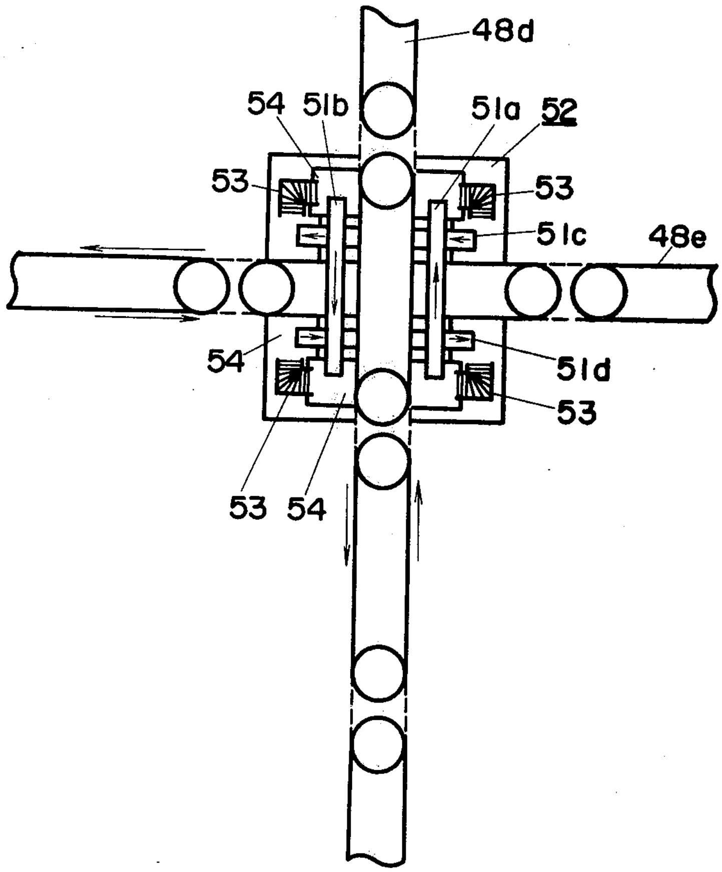
FIG. 29 is a plan view showing the arrangement of the conveyor line used in still another embodiment of this invention.

FIG. 29 shows a section where two conveyor lines $\mathbf{48}_d$ and $\mathbf{48}_e$ are crossing each other to make a graded separation, and a transfer station 52 for the upper and lower lines $\mathbf{48}_d$ and $\mathbf{48}_e$ may be provided by arranging, for example, integrators $\mathbf{51}_a$, $\mathbf{51}_b$, $\mathbf{51}_c$ and $\mathbf{51}_d$ of the type provided according to the previously mentioned embodiments shown in the drawings including FIGS. 2*a*, 2*b* and 12 at this junction point. In other words, the outgoing and return lines of the line $\mathbf{48}_d$ are provided with boarding and alighting sections where the cars travel at a constant speed and the integrators $\mathbf{51}_a$ and $\mathbf{51}_b$ are arranged along these sections, while the line $\mathbf{48}_e$ is provided with similar boarding and alighting sections along which the integrators $\mathbf{51}_c$ and $\mathbf{51}_d$ are arranged, thus making the transfer of people or goods between the cars on the lines $\mathbf{48}_d$ and $\mathbf{48}_e$ and the integrators possible. The integrators of the lines $\mathbf{48}_d$ and $\mathbf{48}_e$ are interconnected by stairs 53 and corridor 54, thus making it possible to transfer from the car on one line to the car on the other line as desired through the integrators.

Generally, the conveyor line may include many different speed sections such as a constant speed section where the car travels at a high speed, deceleration section, boarding and alighting low constant speed section for transfer to and from an integrator or a transfer means and acceleration section, and these sections are suitably combined to complete a continuous conveyor line having a desired speed pattern according to which the cars are continuously operated along the line at speeds higher than a predetermined speed without any stop.

With a continuous transportation system having such a traveling pattern, the distance between the cars in the sections having given speed levels is constant in the constant speed sections, is increased in the acceleration section and is decreased in the deceleration section. Generally, the setting of the speed levels of the cars is such that the speed level is the lowest in the boarding and alighting constant speed section for transfer onto and from an integrator, and the spacing between the cars is also minimized in this section.

On the other hand, with other conditions such as the car speed, etc., being constant, the traffic volume per unit time of the boarding and alighting low constant speed section is a maximum when the continuously traveling cars are moving in a series with a close spacing therebetween. For this reason, in order to increase the traffic volume per unit time of the continuous transportation system in this boarding and alighting low constant speed section or the amount of transfer of people or goods between the continuous transportation system and the integrator providing connection with the ground station, it is only necessary to predetermine the speed level of the other sections and the arrangement of the cars in such a manner that in the boarding and alighting low constant speed section the preceding car travel in close relation with the following car, namely, the distance between the cars is minimized physically. Namely, the transfer of people or goods between the transportation system and the ground side through the integrator cannot be carried out in excess of the traffic volume per unit time of the boarding and alighting low constant speed section of the integrator, and consequently the traffic volume between distant two points is limited to less than the traffic volume of said low constant speed section located between the two points. Further, the traffic volume per unit between the two points will be increased if the boarding and alighting low constant speed section for the integrator is not located between the two points, but this is impractical to the construction of a traffic network. Furthermore, when the cars approach the entrance to the boarding and alighting low constant speed section for the integrator, the cars are successively decelerated to start decreasing the distance between the cars. This is also applicable to the other deceleration sections. This means that in order to prevent the following car in the line from colliding with the preceding car, it is necessary to preset to a minimum value the distance between the cars in the boarding and alighting low constant speed section which is the lowest speed section of the line.

Figure 30:
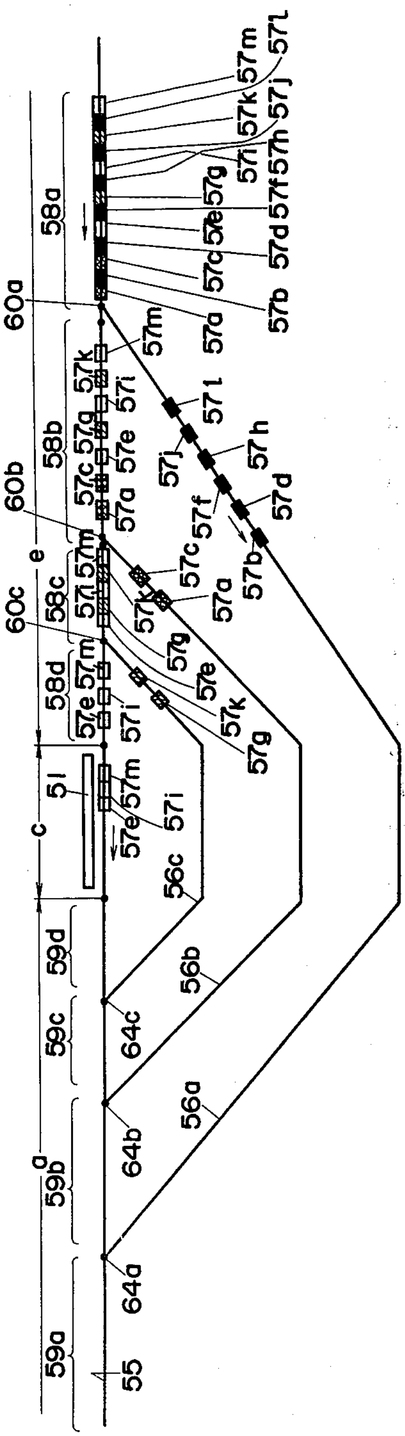
FIG. 30 is a plan view schematically showing in part the conveyor line constituting the track of a continuous transportation system according to still another embodiment of the invention, particularly its lowest and constant speed section for transfer onto an integrator.

FIG. 30 shows a conveyor line having a given length and a desired number of boarding and alighting low constant speed sections designed for use with integrators for transfer of people or goods between the cars of transportation system and the ground station, and this conveyor line is provided, to meet the above-mentioned requirements, with separate conveyor lines providing bypass sections which connect the section before the entrance to the boarding and alighting low constant speed section with the section following the low constant speed section so that the cars which are to be transferred to the bypass lines are separated from other cars, and they are again merged into said following section. FIG. 30 is a plan view showing schematically the conveyor line constituting the track of a continuous transportation system, particularly its low constant speed section for transfer to and from an integrator and the adjoining sections, and in the FIG. numeral 55 designates the line proper, $\mathbf{56}_a$, $\mathbf{56}_b$ and $\mathbf{56}_c$ bypass lines. Each of these lines is a conveyor line having its own speed level and comprising conveyor units which are continuously arranged. The conveyor line 55 comprising the desired straight and curved lines including high constant speed sections is laid in the form of a layout connecting any given two points or a circular line. The Figure shows only a deceleration section e, a low constant speed section c for transfer to and from an integrator and an acceleration section a, and an integrator 51 of the type described for example in connection with FIGS. 2*a* and 2*b* is arranged along the low constant speed section c.

With the boarding and alighting low constant speed section of the conveyor line 55 being in the middle, the preceding deceleration section e is composed of first to fourth deceleration subsections $\mathbf{58}_a$, $\mathbf{58}_b$, $\mathbf{58}_c$ and $\mathbf{58}_d$, and the following acceleration section a includes corresponding first to fourth acceleration subsections $\mathbf{59}_a$, $\mathbf{59}_b$, $\mathbf{59}_c$ and $\mathbf{59}_d$. The bypass conveyor lines $\mathbf{56}_a$, $\mathbf{56}_b$ and $\mathbf{56}_c$ are connected to the conveyor line 55 at diverging points $\mathbf{60}_a$, $\mathbf{60}_b$ and $\mathbf{60}_c$ and emerging points $\mathbf{64}_a$, $\mathbf{64}_b$ and $\mathbf{64}_c$ each of which consists of the previously mentioned parallel portion, so that the bypass conveyor line $\mathbf{56}_a$ interconnects the subsections $\mathbf{58}_a$ and $\mathbf{59}_a$, the bypass conveyor line $\mathbf{56}_b$ interconnects the subsections $\mathbf{58}_b$ and $\mathbf{59}_b$ and the bypass conveyor line $\mathbf{56}_c$ interconnects the subsections $\mathbf{58}_c$ and $\mathbf{59}_c$.

In the Figure, a given number of cars $\mathbf{57}_a$, $\mathbf{57}_b$ . . . $\mathbf{57}_m$ (13 cars in the illustration) are traveling from the right to the left in the illustration in a closely approaching condition in the first deceleration section $\mathbf{58}_a$. This deceleration subsection $\mathbf{58}_a$ has a preset speed level $V_a$ which is lower than the speed of the backward section in the traveling direction so that when the cars $\mathbf{57}_a$ to $\mathbf{57}_m$ which were separated from each other in said backward section enter into the subsection $\mathbf{58}_a$ at a decelerated speed, the cars $\mathbf{57}_a$ to $\mathbf{57}_m$ come closer to each other and the distance between the cars is minimized.

The second deceleration subsection $\mathbf{58}_b$ following the subsection $\mathbf{58}_a$ has a preset speed $V_b<V_a$, the third deceleration subsection $\mathbf{58}_c$ has a preset speed $V_c<V_b$ and the fourth deceleration subsection $\mathbf{58}_d$ has a preset speed $V_d<V_c$. These subsections are connected to the boarding and alighting low constant speed section c of a preset speed $V_o<V_d$. As a result, if the m cars entering into the first subsection $\mathbf{58}_a$ close with one another are allowed to enter into the boarding and alighting low constant speed section c through the conveyor line proper, these cars may be come into collision with each other. In this embodiment, however, at the diverging point $\mathbf{60}_a$ near the end of the first subsection $\mathbf{58}_a$ every other cars $\mathbf{57}_b$, $\mathbf{57}_d$, $\mathbf{57}_f$, $\mathbf{57}_h$, $\mathbf{57}_j$ and $\mathbf{57}_l$ are transferred to the first bypass conveyor line $\mathbf{56}_a$, and the remaining cars $\mathbf{57}_a$, $\mathbf{57}_c$, $\mathbf{57}_e$, $\mathbf{57}_g$, $\mathbf{57}_i$, $\mathbf{57}_k$ and $\mathbf{57}_m$ are allowed to enter into the next subsection $\mathbf{58}_b$ at a decelerated speed thus reducing the car spacing further. Then at near the end of the subsection $\mathbf{58}_b$, the first two cars $\mathbf{57}_a$ and $\mathbf{57}_c$ are transferred to the second bypass conveyor line $\mathbf{56}_b$ at the diverging point $\mathbf{60}_b$, and the remaining five cars $57_e$, $57_g$, $57_i$, $57_k$ and $57_m$ are further decelerated to reduce the distance therebetween and approach one another in the next subsection $58_c$. Then, at the diverging point $60_c$, the second and fourth cars $57_g$ and $57_k$ are transferred to the third bypass conveyor line $56_c$, and the remaining cars $57_e$, $57_i$ and $57_m$ enter into the deceleration section $58_d$ where these cars are further decelerated, and eventually these three cars $57_e$, $57_i$ and $57_m$ which are now closely succeeding one another are allowed to enter into the boarding and alighting low constant speed section with a minimum car distance. Thus, in accordance with this embodiment, only selected cars are allowed to enter into the boarding and alighting low constant speed section for integrator 51 and the other cars are bypassed, thereby increasing the number of cars that can be put in a limited length of the line.

The acceleration subsection $59_d$ following the boarding and alighting low constant speed section c has a preset speed equal to the speed $V_d$ of the deceleration subsection $58_d$, and similarly the speed of the acceleration subsection $59_c$ is preset to the speed $V_c$ of the subsection $58_c$, the speed of the acceleration subsection $59_b$ to the speed $V_b$ of the subsection $58_b$ and the speed of the acceleration subsection $59_a$ to the speed $V_a$ of the subsection $58_a$. Thus, the speed patterns of the deceleration section e and the acceleration section a are symmetrical with the intermediary located section c. Consequently, with the relation between the bypass conveyor lines and the conveyor line proper, by determining the average speed on the bypass conveyor line in such a manner that the time required for the car to pass through the two lines from the diverging point to the emerging point is the same, the cars can be arranged in the same order at the emerging points in a manner quite contrary to the previously mentioned diverging process, thus allowing the thusly arranged cars to procede further from the acceleration subsection $59_a$.

With these bypass conveyor lines, it is only essential to determine the average speeds in the previously mentioned manner, and therefore so far as the required average speeds can be obtained, it is possible to provide each bypass conveyor line with a low constant speed boarding and alighting section for transfer of people or goods to and from a separate integrator.

The above described concept of emerging and diverging can also be applied to the previously mentioned integrator. With the integrator, since the minimum speed section of the line is a low constant speed section for transfer of people or goods to and from a stopping place such as the ground and the maximum speed section of the line is a constant speed section for transfer of people or goods to and from the previously mentioned cars of the continuous transportation system, as for example, when the platforms which were traveling as close as to contact with one another in the boarding and alighting section for transfer of passengers from the stopping place come into the boarding and alighting constant speed section for transfer to and from the cars on the continuous transportation system, the distance between the platforms will be increased to a maximum. In other words, with this type of integrator, the number of passing platforms per unit time is the same at any point in the line, and consequently the loading handling capacity which is dependent of the number of platforms will be a maximum when the platforms are arranged to travel closely as in the minimum speed section. Even in the latter case, however, the distance between the platforms will be increased greatly in the maximum speed section or the constant speed section for transfer to and from the continuous transportation system.

As a result, by allowing other platforms from separate integrators to be merged into the space between the platforms which were left in the constant speed section for transfer with said cars, it is possible to allow a greater number of platforms to travel in the said transfer constant speed section side by side with the cars on the continuous transportation system, thus increasing the transfer capacity between the cars and the platforms and thereby increasing the traffic capacity of the continuous transportation system as a whole.

Figure 31:
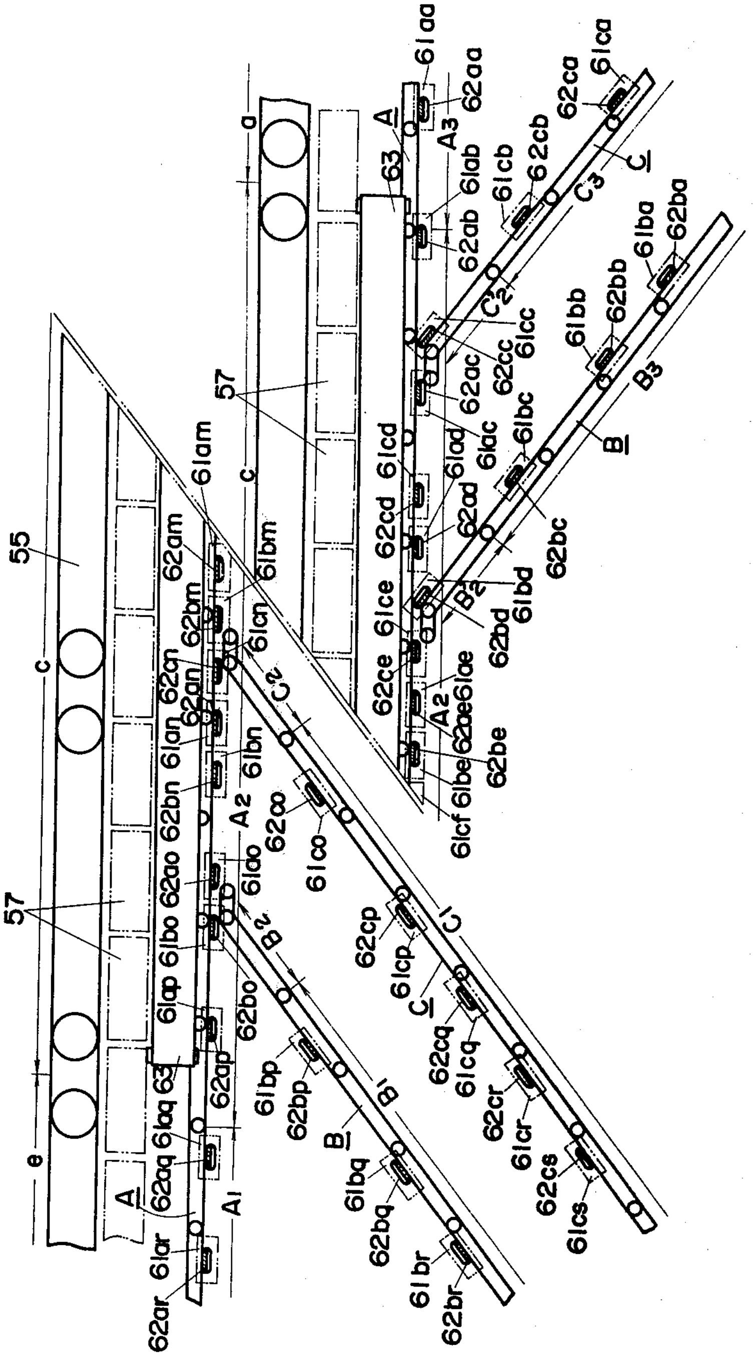
FIG. 31 is a side view showing the arrangement of an integrator conveyor line according to still another embodiment of this invention.

An embodiment incorporating this type of arrangement will now be described in detail with reference to the drawing. FIG. 31 is a plan view schematically showing the principal parts of this embodiment, and in the Figure reference characters A, B and C designate the conveyor lines of separate integrators, $A_1$ an acceleration section of the conveyor line A, $A_2$ a constant speed section for transfer to and from the continuous transportation system, $A_3$ a deceleration section, $B_1$ an acceleration section of the conveyor line B, $B_2$ and $B'_2$ merging and diverging constant speed section of the line B, $B_3$ a deceleration section of the line B, $C_1$ an acceleration section of the conveyor line C, $C_2$ $C'_2$ merging and diverging constant speed sections of the line C, $C_3$ a deceleration section of the line C. Also in the Figure, numeral 55 designates the conveyor line of the continuous transportation system including a deceleration section e, a low constant speed section c for transfer to and from the integrators, an acceleration section a and other acceleration and deceleration sections and constant speed sections which are not shown, and cars 57 as continuously operated at all times as shown in the Figure. Numeral 63 designates a belt conveyor always circulating at the same speed as the traveling speed of the cars 57 in the section c to serve as a transfer platform between the cars and the integrators. Since the transfer of passengers between the integrators and the cars is accomplished in a moving system having a speed relative to the ground or the like, it is desirable from a safety point of view to increase as far as possible the area used for transfer of passengers and also increase greatly the freedom of action of the passengers, and the belt conveyor 63 is provided for this puspose. While, in the embodiment shown in FIG. 31, each of the integrators comprises a conveyor line which is constructed by continuously arranging a plurality of conveyor units in such a manner that their magnetic belt surfaces are arranged to face laterally. However, where these integrator conveyor lines comprise continuously arranged conveyor units each having multiple-belt magnetic belt structure having the magnetic belt surfaces positioned to face vertically as shown in FIGS. 2a and 2b, in the integrator conveyor line portions extending parallel to the belt conveyor 63 or the transfer platform a separate multistrand belt may be placed between the multiple-belt magnetic belts to be flush therewith and rotate at the same speed therewith, thereby making it possible to use these integrator conveyor line portions as a space where the passengers can walk around and thereby further increasing the degree of freedom of action of the passengers. The belt conveyor 63 and the separate multistrand belts placed between the magnetic belts may be driven in these areas from the same driving sources with the integrator conveyor units and the continuous transportation system.

In FIG. 31, the integrators are arranged in a multiple divergence configuration in which the conveyor lines B and C merge with and diverge from the boarding and alighting constant speed section $A_2$ of the conveyor line A for transferring the people or goods to and from the cars of the continuous transportation system through the upper belt surface of the transfer platform 63, and the section $A_2$ is used as a common conveyor lines A, B and C includes its own boarding and alighting low constant speed section (not shown) at a stopping place, e.g., the ground from which the lines lead through the sections $A_1$, $B_1$ and $C_1$ and join with the section $A_2$, and the lines again diverge from near the end of the section $A_2$ into the sections $A_3$, $B_3$ $C_3$ and lead to the previously mentioned boarding and alighting low constant speed sections or separate similar sections at the same or stopping places, e.g., the ground. In FIG. 31, numeral 61 designates platform bodies, 62 platform body field sytems, and suffixes (aa) to (ar), (ba) to (br) and (ca) to (cs) indicate association with the conveyor lines A, B and C. FIG. 31 shows the position of the platform bodies traveling along these lines at a particular point, and the platform body $61_{aa}$ belonging to the conveyor line A, the platform bodies $61_{ba}$, $66_{bb}$ and $61_{bc}$ belonging to the conveyor line B and the platform bodies $61_{ca}$ and $61_{cb}$ belonging to the conveyor line C are now traveling respectively in the deceleration sections $A_3$, $B_3$ and $C_3$ of these lines after passing through the boarding and alighting constant speed section $A_2$ driven at the same speed as the cars 57 or the belt conveyor 63. The platform body $61_{bd}$ of the conveyor line B and the platform body $61_{cc}$ of the conveyor line C are beginning to diverge into the respective sections $B'_2$ and $C'_2$ from the section $A_2$, and the sections $B'_2$ and $C'_2$ have the same preset speed as the section $A_2$ in order to ensure smooth diverging movement as will be described later.

The platform bodies $61_{ab}$ to $61_{ap}$ belonging to the conveyor line A, the platform bodies $61_{be}$ to $61_{bo}$ belonging to the conveyor line B and the platform bodies $61_{cd}$ to $61_{cn}$ belonging to the conveyor line C are all located in the section $A_2$ of the line A so that these platform bodies are traveling along with the movement of the magnetic belts of the conveyor units in the section $A_2$ by virtue of the magnetic attraction therebetween, and of these platform bodies the platform body $61_{bo}$ of the line B and the platform body $61_{cn}$ of the line C have just merged into the section $A_2$ through the sections $B_2$ and $C_2$, respectively.

On the other hand, the platform bodies $61_{aq}$ and $61_{ar}$ belonging to the conveyor line A, the platform bodies $61_{bp}$, $61_{bq}$ and $61_{br}$ belonging to the conveyor line B and the platform bodies $61_{co}$, $61_{cp}$, $61_{cq}$, $61_{cr}$ and $61_{cs}$ belonging to the conveyor line C are in the respective acceleration sections of these lines so that these platform bodies are being accelerated to attain the speed of the boarding and alighting constant speed section $A_2$ for the cars 57 through the belt conveyor or platform 63.

It is assumed that the speed of the platform bodies on all the conveyor lines is preset so that the platform bodies of the conveyor line A travel in the section $A_2$ at a constant speed while maintaining a predetermined maximum spacing therebetween, and the platform bodies of the conveyor lines B and C also travel in the section $A_2$ while maintaining the same spacing as the said maximum spacing. In the conditions shown in FIG. 31 where the platform bodies of the line A are traveling in the section $A_2$ with the spacing which is sufficient to locate two platform bodies therein, the platform body $61_{bo}$ belonging to the line $B_2$ is merged between the platform bodies $61_{ab}$ and $61_{ap}$ in the section $A_2$, and when the platform bodies $61_{ao}$, $61_{bo}$ and $61_{ap}$ arrive at the next merging point while maintaining between the platform bodies $61_{bo}$ and $61_{ap}$ a space sufficient for one platform body, the platform body $61_{cp}$ belonging to the line C is merged between the platforms $61_{bo}$ and $61_{ap}$ from the line $B_2$, thus forming a train including the platform bodies $61_{ao}$, $61_{bo}$, $61_{cp}$ and $61_{ap}$ in this order and traveling through the section $A_2$. Also the platform $61_{co}$ is merged between the platform bodies $61_{bn}$ and $61_{ao}$ from the line C, the platform body $61_{bp}$ is merged at the back of the platform $61_{ap}$ from the line B, and then the platform $61_{cq}$ is merged from the line C. Thus, in the section $A_2$ the platform bodies from the respective lines are merged and travel in a closely succeeding condition or a similar condition, and the density of the trucks in the section is increased to the line times as large. At near the end of the section $A_2$, the platform bodies belonging to the respective lines are diverged into the respective lines B and C in a manner reverse to previously mentioned process, and the platform bodies travel toward the respective boarding and alighting low constant speed sections at the stopping places, e.g., the ground while being decelerated.

Figure 32:
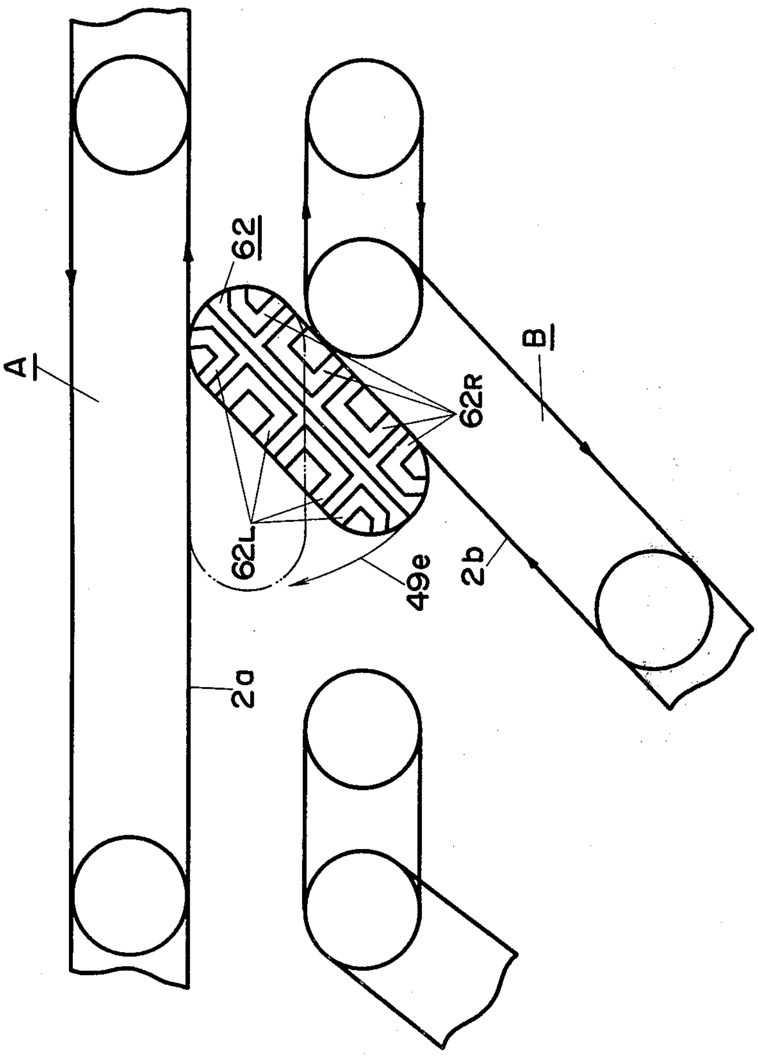
FIG. 32 is a partial enlarged side view of FIG. 31.

In the case of a conveyor line comprising conveyor units each having the magnetic belts adapted to move around with the belt surface positioned vertically, the above-mentioned merging and diverging between two lines may be accomplished in the following manner. Namely, as shown in FIG. 32, the field system 62 of each platform body has a field system structure comprising a plurality of right and left units, so that when the platform body traveling along with the movement of magnetic belts $2_b$ of the line B by the magnetic attraction caused by the energization of the right-hand field units $62_R$, arrives at the merging point as shown in FIG. 32, the energization may be switched to the left-hand field units $62_L$ so that the field system 62 is rotated in the direction of an arrow $49_e$ and the field system 62 is magnetically attracted with magnetic belts $2_a$ of the line A, after which the platform body is caused to travel along with the movement of the magnetic belts $2_a$ of the line A, thus, accomplishing the desired merging. The desired diverging may be accomplished in an entirely reverse manner, and the switching of energization of the field system for merging or diverging purposes may be automated by accomplishing the switching of the field system of each platform body of each line by means of its own limit switch, external control signal or the like. In FIG. 31, the hatched halves of the field systems indicate the energized halves of the field systems. Also, since the field system of each platform body is rotated to change the traveling direction of the body at the merging or diverging point as shown in FIG. 32, if the platform of different lines are to be merged into and diverged from the line $A_2$ with the same timing, it is necessary that the distance between the adjacent merging and diverging points is at least greater than the length of the platform body. In FIG. 32, the field system structure comprises a plurality of the field units $62_L$ and $62_R$ which are arranged on the side in the lengthwise direction, because the rotation of the field system during merging may be effected more smoothly by deenergizing the right hand field unit $62_R$ sequentially starting at the top unit (however, the top field unit may be kept energized for a while) and sequentially energizing the left hand field units $62_L$ starting at the top unit. The rotation of the field system during diverging can also be accomplished smoothly in a manner reverse to the above-mentioned operation.

Figure 33:
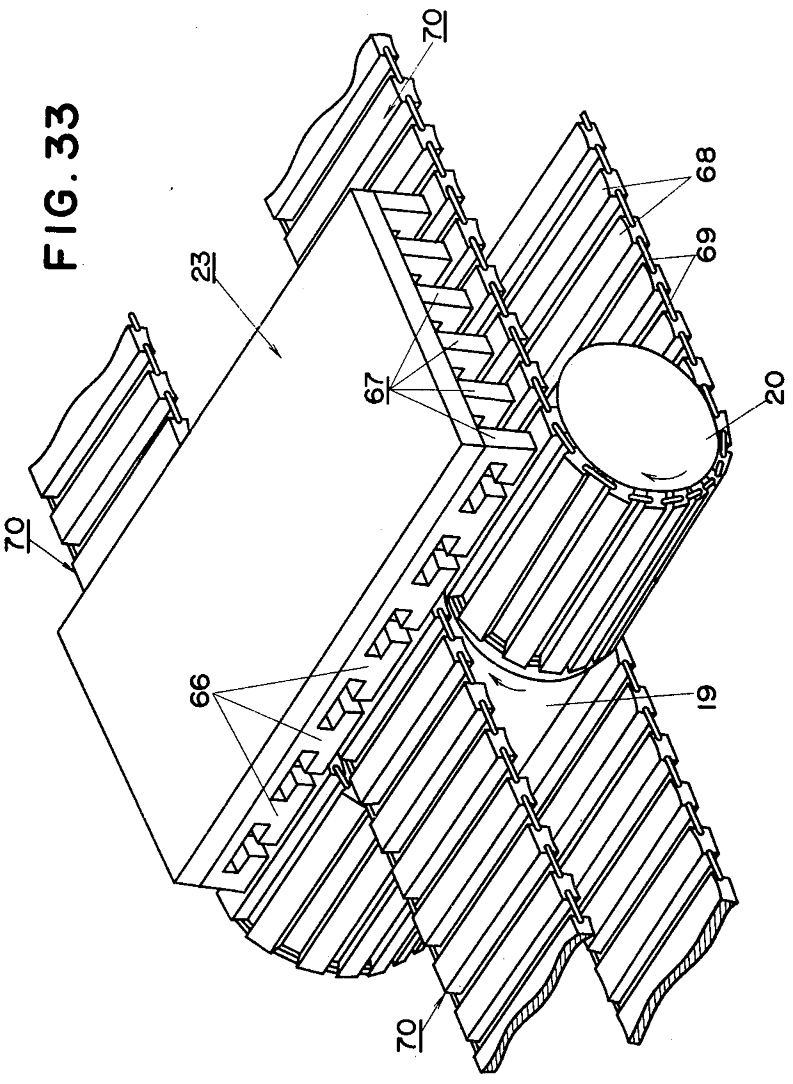
FIG. 33 is a perspective view showing the construction of the field system and the magnetic belt structure according to still another embodiment of this invention.

The use of this field system structure comprising a plurality of field units has another effect of preventing any sudden change in the magnetic attraction during the transfer of the field system from one unit to another irrespective of the magnetic belts being arranged to rotate vertically or horizontally. Preferably, the lengthwise division of the field system should have the same pitch as the lengthwise division of the magnetic material of the magnetic belts, and the widthwise division of the field system should be effected simultaneously. In other words, as shown in FIG. 33 by way of example, the field system of a platform body 23 comprises a plurality of field units 67 each including a plurality of small magnetic poles 66, and magnetic bars 68 are connected by joints 69 with the same pitch as the spacing of the field units 67 thus forming magnetic belts 70. In this case, the bottom surface of the magnetic bars 68 is formed into a concave surface to correspond with the curved outer surface of a driving wheel 19 and idle wheels 20 thus ensuring improved transmission of rotary motion, and preferably the outer layers of the driving and idle wheels are made of a magnetic material thus allowing the magnetic flux from the field system to pass through the driving and idle wheels.

In other words, when the magnetic belt moves around the end of the line downwardly or upwardly and the field system is located on the lower side, a force is produced which acts to cause the magnetic bars to separate from the outer surface of the driving or idle wheel due to the weights of the field system and of the magnetic belt, and this force is compensated by the magnetic attraction between the field system and the magnetic layer on the driving wheel surface for example, thus compensating the contact between the magnetic bars 68 and the driving wheel outer surface to maintain the driving force due to the surface frictional force therebetween. The provision of this magnetic layer on the outer surface of the driving wheel is also effective in the applications where the magnetic belt moves around in a horizontal plane, in which case during the turning of the field system around the line end the magnetic attraction of the field system by the magnetic layer acts as a centripetal force to cancel the centrifugal force acting on the field system.

On the other hand, at the connection between the conveyor units in the line, as for example, during the time that the field system passes from the magnetic belt of the preceding unit onto the magnetic belt of the following unit, the two units are operated at different speeds to impart a positive or negative acceleration to the field system. In this case, if the field system travels with its end face held fast to the surface of the magnetic belt, during the transfer from one to the other of the units having the different speed levels wear due to slip is caused between the field system end face and the bar surface of the magnetic belt. In other words, during the time that the field units traveling by being held fast to the magnetic bars of the magnetic belt on the preceding unit is transferred onto the magnetic bars of the magnetic belt on the following unit rotating at a higher speed, the magnetic bars of the magnetic belt on the following unit catch up from behind, on the driving wheel at the connection between the two units, with the field units which are arriving by being held fast to the magnetic bars of the preceding unit, so that the magnetic bars of the following unit come under the field units while slipping on the field system end face, and the field units is transferred to the magnetic bars of the following unit by the movement of the field system, with the magnetic bars of the preceding unit being left behind while slipping on the field system end face thus completing the transfer of the field units. In this case, by forming the forward edge shoulder of each magnetic bar with a suitable curved surface by chamfering, it is possible to cause the front edges of magnetic bars to smoothly strike the field system end face while the magnetic bars moving under the field system end face, and moreover by forming the front edge shoulder of the lower end of each field unit with a similar suitably curved surface, it is possible to relieve the hit between the field units and the rear edges of the magnetic bars while the field units more over the magnetic bars, thus preventing the occurrence of shock to the field system during the transfer from one unit to the other and reducing the wear of the field system and the magnetic bars. Further, as a measure for reducing the wear, the lower end portion of each field unit may be comprised of a wear allowance portion made of a softer magnetic material than the magnetic bars as an effective means of preventing wear of the magnetic bars which are supposedly more difficult to repair as compared with the field system. If, however, the magnetic bars are easier to repair than the field system, the magnetic bars may be made of a softer magnetic material than the field system lower end portion. In short, it is desirable to use a harder material for one whose wear is to be reduced.

While the integrator described in connection with FIG. 31 represents one method designed to increase the transport capacity, an improved transport capacity may be ensured by another method with a conveyor line of the type shown in FIGS. *2a* and *2b*.

Figure 34:
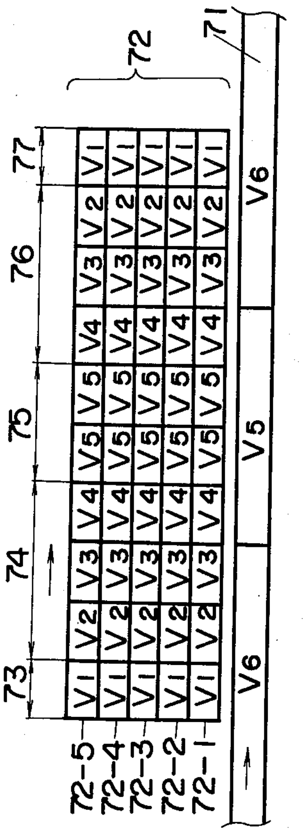
FIG. 34 is a plan view showing an embodiment of an integrator line arrangement according to the invention, including a plurality of conveyor lines which are arranged in a multiple connection configuration.

In other words, as shown in FIG. 34, five conveyor lines 72-$_1$, 72-$_2$, . . . , and 72-$_5$ of the same construction are arranged side by side along car traveling line 71 of a continuous transportation system thus forming an integrator 72. Arranged along the car traveling line 71 are a constant speed section 73 of a constant speed $V_1$ for taking a car, an acceleration section 74 having speed levels $V_2$, $V_3$ and $V_4$ which are increased stepwise, a constant speed section 75 of a constant speed $V_5$ for boarding on and alighting from a car, a deceleration section 76 having the speed levels $V_4$, $V_3$ and $V_2$ which are decreased stepwise, and a constant speed 77 of the constant speed $V_1$ for alighting on the ground. By arranging a plurality of the conveyor lines 72-$_1$, 72-$_2$, . . . , and 72-$_5$ in this manner, the width of the constant speed sections 73 and 77 for transfer of passengers between the ground and cars or the total area of the platform bodies traveling in the constant sections can be increased five times as compared with the conventional single conveyor line integrator, and moreover by making it possible for the passengers to transfer from one platform body to another as desired, the loading handling capacity can be increased sufficiently.

Figure 35:
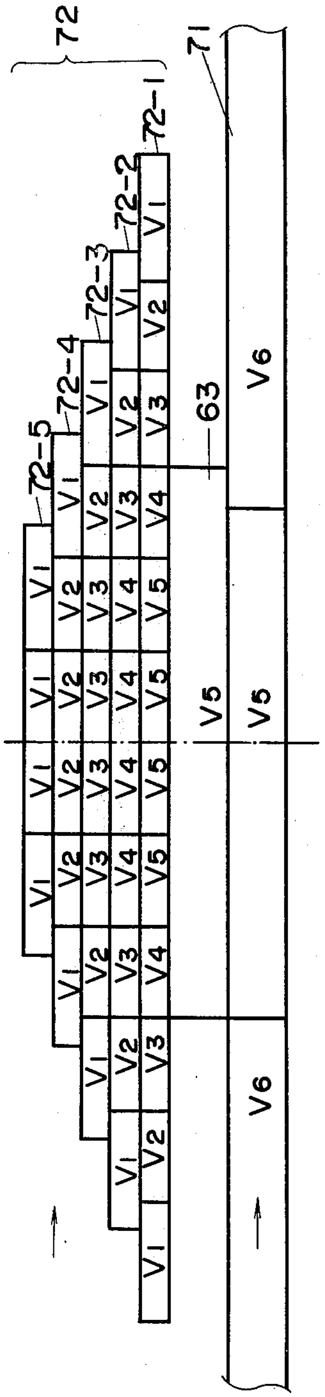
FIG. 35 is a schematic view showing another embodiment of the integrator according to the invention having an improved boarding and alighting capacity.

FIG. 35 shows another embodiment similar to the embodiment of FIG. 34, and this embodiment is designed to solve the problem of a plot area of the embodiment of FIG. 34 and also to increase the loading handling capacity. In the embodiment of FIG. 35, a belt conveyor or transfer platform 63 of the type shown in FIG. 31 is arranged between the car traveling line 71 and the integrator 72, and the respective conveyor lines are arranged fanwise so that the speed levels of the conveyor unit of the adjoining conveyor lines in the same sections in the traveling direction of cars are decreased by one rank as the distance from the car traveling line 71 is increased. As a result, excepting the side of the conveyor line 72-$_1$ which is extended along the car traveling line 71, the plurality of the conveyor lines 72-$_1$, 72-$_2$, . . . , and 72-$_5$ are enclosed by the constant speed sections of the constant speed $V_1$ which permit the transfer of people or goods between the ground and cars. Thus, the boarding and alighting of people or goods can be accomplished in the following manner. Namely, people or goods can first get on the moving belt 63 from the platform bodies moving therealong by the conveyor lines through any route involving $V_1 \rightarrow V_2 \rightarrow V_3 \rightarrow V_4 \rightarrow V_5$ and then take to the car from the moving belt 63. On the other hand, the people or goods alighting from the cars can get to the ground side through any route involving $V_5 \rightarrow V_4 \rightarrow V_3 \rightarrow V_2 \rightarrow V_1$. Thus, by virtue of the increased constant speed $V_1$ sections 72-$_5$ and the fanwise distribution of the conveyor lines, the boarding or handling capacity of the integrator can be increased and at the same time the site area of the integrator conveyor line can be relatively small.

Figure 36:
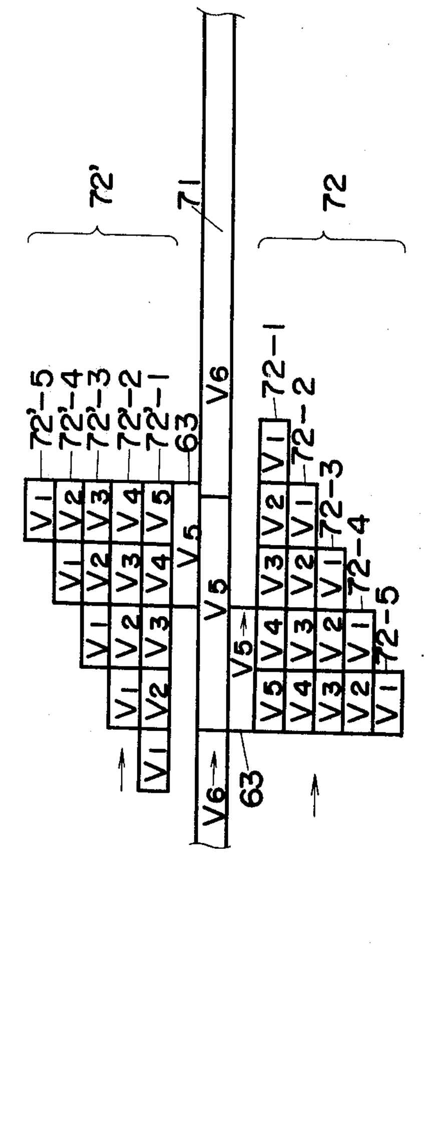
FIG. 36 is a schematic view showing still another embodiment of the integrator in which the boarding and alighting lines are divided further to further improve its boarding and alighting capacity.

When it is desired to further increase the loading or handling capacity, a multiple-line integrator conveyor line of the type shown in either FIG. 34 or 35 on each side of the car traveling line 71. FIG. 36 shows an other modified conveyor line arrangement for this purpose.

More specifically, an exclusive alighting line 72 begins with a constant speed $V_5$ section for alighting from cars and includes further a conveyor line 72-$_1$ leading to $V_5 \rightarrow V_4 \rightarrow V_3 \rightarrow V_2 \rightarrow V_1$, a conveyor line 72-$_2$ leading to $V_3 \rightarrow V_2 \rightarrow V_1$, a conveyor line 72-$_3$ leading to $V_3 \rightarrow V_2 \rightarrow V_1$, a conveyor line 72-$_4$ leading to $V_2 \rightarrow V_1$ and a conveyor line 72-$_5$ of $V_1$, the conveyor lines being arranged side by side. On the other hand, an exclusive boarding line 72' begins with a constant speed section $V_1$ for boarding from the ground and further comprises a conveyor line 72'-$_1$ leading to $V_1 \rightarrow V_2 \rightarrow V_3 \rightarrow V_4 \rightarrow V_5$, a conveyor line 72'-$_2$ leading to $V_1 \rightarrow V_2 \rightarrow V_3 \rightarrow V_4$, a conveyor line 72'-$_3$ leading to $V_1 \rightarrow V_2 \rightarrow V_3$, a conveyor line 72'-$_4$ leading to $V_1 \rightarrow V_2$ and a conveyor line 72'-$_5$ of $V_1$, the conveyor lines being arranged side by side. The exclusive alighting line 72 and the exclusive boarding line 72 are so arranged relative to a boarding and alighting constant speed section of a continuous transportation system car traveling line 71 that the constant speed $V_5$ and $V_4$ conveyor units in the conveyor line 72-$_1$ of the exclusive alighting line 72 are positioned at the car entry side of the boarding and alighting constant speed section $V_5$ of the car traveling line 71 through a moving belt 63, and the constant speed $V_5$ and $V_4$ conveyor units in the conveyor line 72'-$_1$ of the exclusive boarding line 72' are similarly positioned through a moving belt 63 at the exit of the cars in the boarding and alighting constant speed section $V_5$ of the car traveling line 71 in an overlapped relation or a suitable spacing therebetween. By thus arranging the boarding and alighting conveyor units of the exclusive alighting line 72 and the exclusive boarding line 72' so as to be staggered by a desired distance or in an overlapped relation but not to be opposed each other, the cars entering the boarding and alighting section $V_5$ let the loaded people or goods to alight at first on the empty platform bodies entering the exclusive alighting line, and then the people or goods on the platform bodies passing over the exclusive boarding line are transferred onto said cars, thus eliminating the possibility of congestion due to the use of the common section for simultaneous boarding and alighting.

Figure 37A:
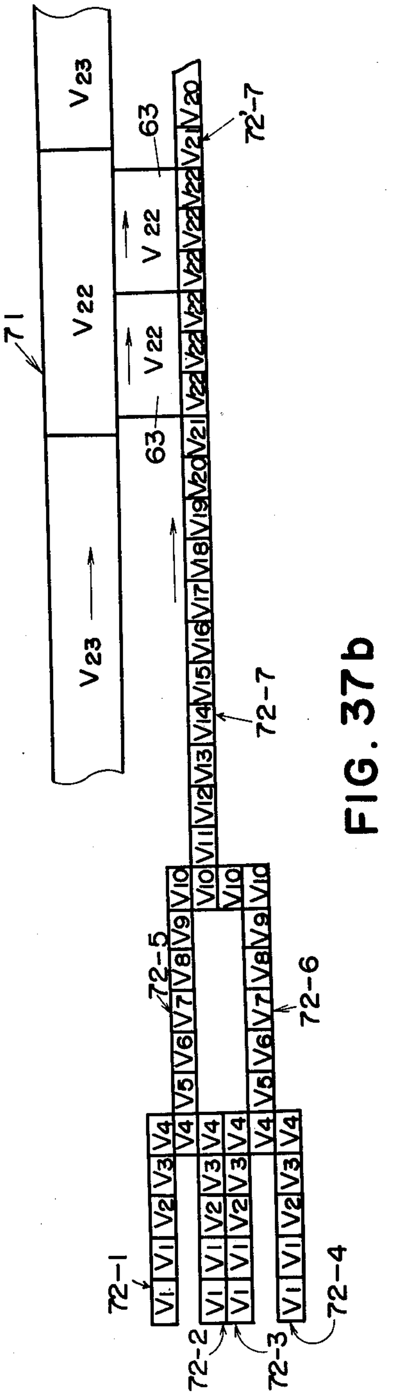
FIG. 37*a* is a plan view showing the line arrangement of an integrator according to still another embodiment of the invention.
Figure 37B:
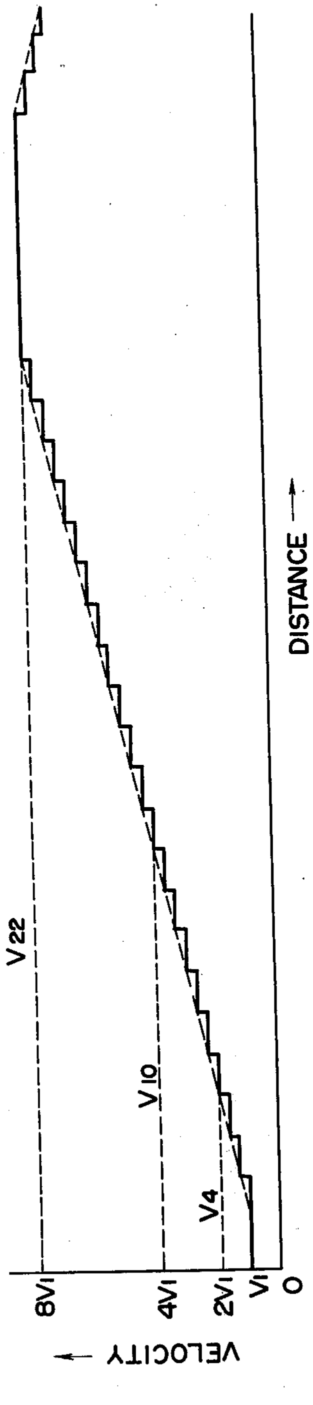
FIG. 37*b* is a graph showing the speed distribution of the integrator shown in FIG. 37*a*.

FIG. 37*a* is a plan view showing a conveyor line arrangement of an integrator according to still another embodiment, and FIG. 37*b* is a graph showing a speed level distribution corresponding to FIG. 37*a*. Four conveyor lines 72-$_1$, 72-$_2$, 72-$_3$ and 72-$_4$ include the conveyor units of speeds $V_1$ to $V_4$ and $V_4 = 2\ V_1$. Connected to these four lines are conveyor lines 72-$_5$ and 72-$_6$ comprise the conveyor units of speeds $V_4$ to $V_{10}$, and $V_{10} = 2\ V_4 = 4\ V_1$. Also connected to the conveyor lines 72-$_5$ and 72-$_6$ are conveyor lines 72-$_7$ and 72'-$_7$, of which the conveyor line 72-$_7$ comprises the conveyor units of speeds $V_{10}$ to $V_{22}$ which is two times the speed $V_{10}$ or eight times the speed $V_1$, i.e., $V_{22} = 2V_{10} = 8V_1$, and the continuously arranged high speed $V_{22}$ units are arranged parallel to a constant speed $V_{22}$ section of a continuous transportation system conveyor line 71 through a belt conveyor 63 constituting a transfer platform. In the illustrated embodiment, the conveyor units of the respective conveyor lines are successively arranged with the same speed differences, and the platform bodies are adapted to circulate through their own lines. The platform bodies are operated by preliminarily determining the spacing and phase of the platform bodies on the respective lines so that at the connections between the lines, e.g., at the $V_4$ unit of the line 72-$_5$, the platform bodies alternately arrive at the $V_4$ unit of the line 72-$_1$ and the $V_4$ unit of the line 72-$_2$ in synchronism with the platform bodies of the line 72-$_5$. While the number of units in the higher speed line is two times that of the lower speed minus 1, by changing the speed difference between the units, it is possible to construct an integrator with conveyor lines having the same number of units.

In the arrangement shown in FIG. 37*a*, as shown in FIG. 37*b*, the platform body is accelerated from the speed $V_1$ with a linear acceleration speed gradient to reach the belt conveyor 63, and the platform body is led to the ground side according to the similar deceleration gradient inversely to the acceleration gradient. By thus classifying the respective lines by speed ranks, as compared with the arrangement in which the conveyor units of $V_1$ to $V_{22}$ are arranged in a single continuous line, the platform body spacing in the high speed line can be made small to thereby increase the transport capacity of the system on the whole.

Where the integrators of the above-mentioned various line configurations are used along with a continuous transportation system operated on an elevated track, a boarding station or alighting station for the integrator may be provided under the elevated track, and the necessary units may be laterally extended successively from such station to traveling along the continuous transportation system. In this way, the space which would otherwise be useless can be utilized effectively, and this is generally applicable to all applications where there is a difference in level between the boarding or alighting place of the integrator and the continuous transportation system.

While the basic forms of the construction of the track for the transportation system have been described, many other changes and modifications are possible. For example, the required guide tracks may be provided by utilizing the casings of the conveyor units mounted on the supporting girder, and moreover the conveyor units may be arranged in many different ways.

Figure 38:
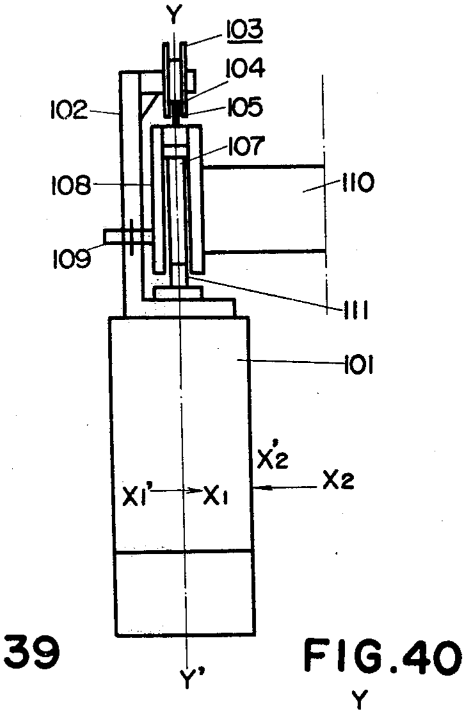
FIG. 38 is a sectional view showing a cantilever suspension type belt conveyor continuous transportation system.
Figure 39:
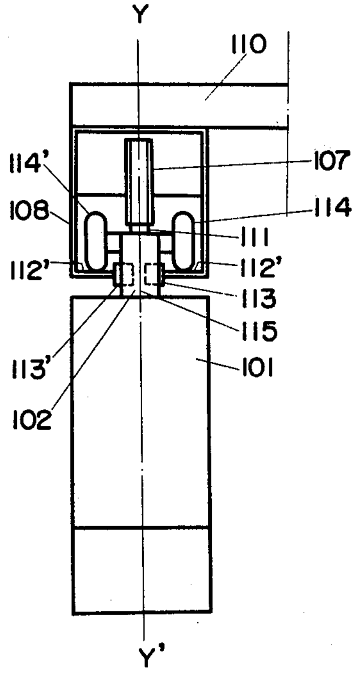
FIG. 39 is a sectional view showing a more stable suspension type belt conveyor continuous transportation system.

For instance, as shown in FIG. 38, a conveyor unit 107 with a magnetic belt is laid in a casing 108 which is laid on a supporting girder 110, and the bottom surface is exposed so that a car field system 111 is attracted or stuck to the magnetic belt surface and a driving force is produced in a car 101 in the direction of movement of the magnetic belt. Mounted on the upper surface of the casing 108 is a monorail 104 having a supporting guide wheel 103 sitting astraddle thereon, and the outer wall of the 108 serves as a guide track for a guide wheel 109. With this cantilever conveyor line, the suspended car 101 is moved by the supporting guide wheel 103 laid on a supporting arm 102. In the case of this cantilever suspension type conveyor line, there is a need to prevent oscillation of the car 101 due to wind or the like, particularly sidewise oscillation of the car 101, and consequently it is necessary to design so that the center of gravity of the car is devivated to either side relative to a suspension axis Y-Y′ of the car 101, and the car 101 is always pressed by means of the guide 109 against the outer wall of the casing 108 accommodating the conveyor unit 107 therein. In this case, however, if wind pressure, the centrifugal force at the curved length of the track or any other external force acts in a direction $X_2$-$X'_2$ which is opposite to a pressing direction $X_1$-$X'_1$, this tends to cause oscillation of the car 101. On the other hand, depending on the degree of oscillation, the car 101 will be prevented from running off the monorail 104 only by means of projecting flanges 105 of the supporting guide wheel 103 rolling on the monorail 104, and this presents a problem from a safety point of view in that there is the possibility of the car running off and falling from the monorail structure. FIG. 39 is a sectional view of an embodiment designed to solve the previously mentioned structural defect. More specifically, the lower inner walls of a casing 108 are designed to serve as guide tracks 112 and 112′ for supporting rolling-wheels of a car 101, and the car 101 is also supported by supporting wheels 114 and 114′ which are laid on a supporting arm 102 to be positioned on both sides of a suspension axis Y-Y′ of the car 101, thus suspending and supporting the car 101 with greater stability. As a result, the sidewise oscillation due to external force can be reduced, with the result that there is not danger of the car 101 running off and falling from the guide tracks 112 and 112′ as far as the casing 108 is not broken or not torn off the supporting girder 110.

The casing 108 is also formed with a downwardly opened opening 115 so that the car field system 111 and the supporting arm 102 having the supporting wheels 114 and 114′ and guide wheels 113 and 113′ laid thereon are movable along with the movement of the car, and consequently the guide wheels 113 and 113′ are laid on the supporting arm 102 by means of suitable spring supporting mechanisms so that the guide wheels 113 and 113′ can roll so as to expand the opposed edge sides of the opening 115 to either sides of the suspension axis Y-Y′, thus making it possible to use the edges of the opening 115 as guide tracks for the car movement as well as guide tracks for preventing sidewise oscillation of the car.

Moreover, since the bottom inner walls 112 and 112′ of the casing 108 are utilized as the traveling tracks of the supporting wheels 114 and 114′, there is no need to mount the monorail 104 on the upper surface of the casing for supporting and guiding the car as in the embodiment shown in FIG. 38, and as will be seen from the embodiment of FIG. 39 the spacing between the supporting wheels 114 and 114′ can be made sufficiently large through the opening 115 of the casing 108, thus completely eliminating structurally the danger of the car 101 from getting off and falling from the casing 108. Particularly, due to the fact that the casing 108 accommodates therein all of the supporting wheels 114 and 114′, the guide wheels 113 and 113′, the car field system 111 and the supporting arm 102 where serve to suspend, guide and move the car 101, an improved weather resistance is ensured thus making it possible to ensure a longer useful life.

Figure 40:
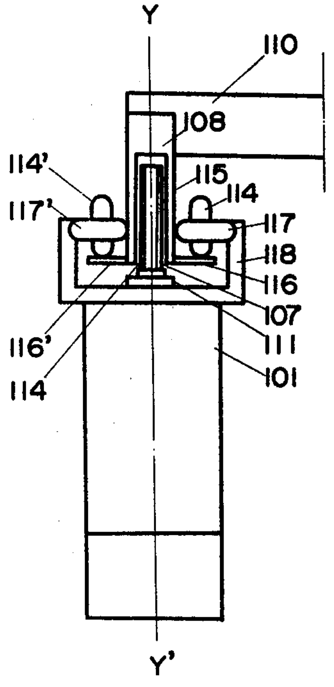
FIG. 40 is a similar sectional view of still another embodiment.

FIG. 40 shows another embodiment featuring in that while, in the embodiment shown in FIG. 39, the inner walls of the casing 108 are used as the guide tracks, the outer walls of the casing 108 are used as the guide tracks. More specifically, overhang member 116 and 116′ are provided on the opposed lower side wall ends to project therefrom, and guide wheels 117 and 117′ utilize the side walls of the casing 108 as their guide track surface. To suit the guide tracks thusly provided on the casing 108, a supporting arm 118 has a C-shaped frame structure having an open upper end.

While some embodiments of the suspension type transportion system have been described, various embodiments of astride type transportation system are also possible as will be described hereunder.

Figure 41:
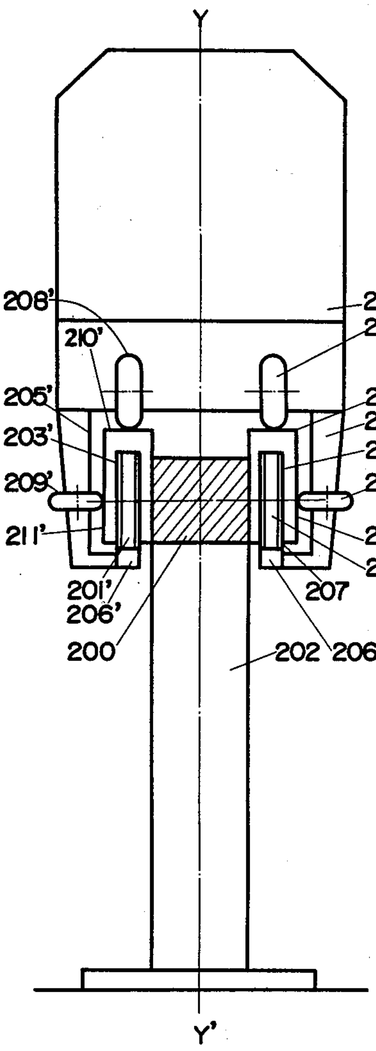
FIG. 41 is a front view showing an embodiment of an astraddle type transportation system according to the invention as viewed from the direction of travel.

FIG. 41 is a sectional view showing an embodiment of an astride type transportation system. In the Figure, the conveyor line comprises a pair of casings 203 and 203′ respectively accommodating therein magnetic belt conveyor units 201 and 201′ of a desired unit length to provide circulating endless tracks, and the casings 203 and 203′ are arranged on both sides of a coupling unit 200 incorporating a drive source and supported on each of posts or pedestals 202 which are provided at predetermined intervals. The conveyor units 201 and 201′ having magnetic belts and accomodated in the casings 203 and 203′ are arranged to extend over a desired section length. The casings 203 and 203′ accommodating the conveyor units 201 and 201′ are arranged symmetrically with a center axis or symmetrical axis Y-Y′, and each of the casings 203 and 203′ is provided in the lower portion thereof with an opening 207 so that field systems 206 and 206′ which are mounted through supporting structures on a car 204 to produce magnetic attraction between the field systems and the magnetic belts of the conveyor units 201 and 201′ to move the car 204 sitting astride, are positioned opposite to the openings 207 with a desired gap therebetween which allows the field systems to be forcibly stuck or attracted to the magnetic belts to move along with the circulating movement of the magnetic belts.

On the other hand, the car 204 is supported on supporting wheels 208 and 208′ which are mounted on the truck of the car 204 and which utilize top walls 210 and 210′ of the casings 203 and 203′ as their traveling surfaces, and the car 204 is also supported by a pair of guide wheels 209 and 209′ which are mounted on supporting structures 205 and 205′ which are provided on the lower portion of the car 204 to enclose the casings 203 and 203′ so that outer walls 211 and 211′ of the casings 203 and 203′ serve as the guide tracks for the guide wheels 209 and 209′. Thus, the car 204 travels along with the movement of the magnetic belts of the conveyor units 201 and 201′.

With this embodiment, it is not absolutely necessary to provide a separate drive source for each of the left and right hand conveyor units 201 and 201′, and therefore a common drive source may be incorporated in the coupling unit 200 positioned between the casings 203 and 203′ holding the conveyor units therein so as to realize concentration of the equipment and saving of the required space. Further, when it is desired to make smaller the sidewise oscillation of the running car, they may be attained by arranging in a two-stage configuration at least two sets of the guide wheels 209 and 209′ which are pressed against and roll over the guide track surfaces formed on the side walls 211 and 211′ of the casings 203 and 203′.

Thus, by virtue of the supporting traveling tracks and the guide tracks provided by the outer surfaces of the casings 203 and 203′ forming therein a pair of left and right conveyor lines comprising the conveyor units arranged in long lines and the wheel structures comprising the supporting wheels 208 and 208′ and the guide wheels 209 and 209′ which roll over these tracks, it is possible to completely eliminate the danger of the car running off and falling from the track by such external force as the wind pressure, the centrifugal force, or the like to be suffered during the running of the car, and it is also possible to sufficiently reduce the sidewise oscillation of the car by external force.

Figure 42:
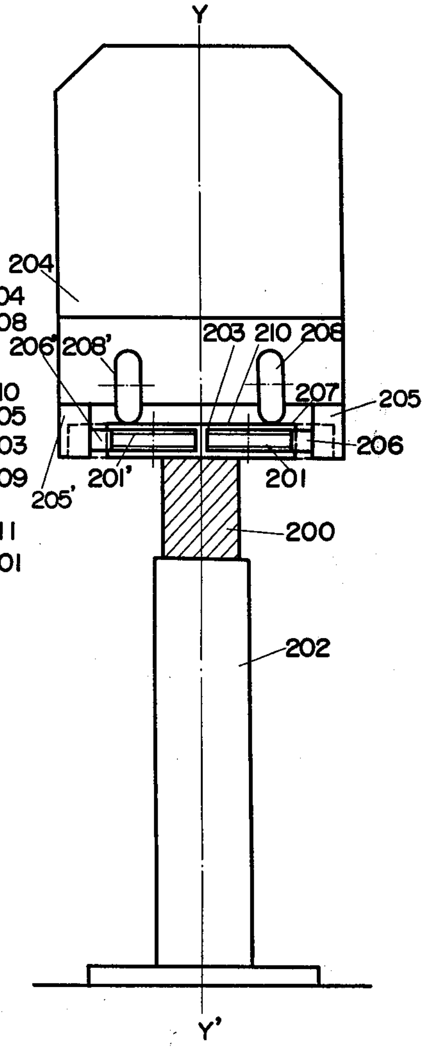
FIG. 42 is a similar front view of another embodiment.

FIG. 42 shows another embodiment of the astride type transportation system with the conveyor units 201 and 201′ which are arranged to form horizontal circulating tracks. In other words, the conveyor lines are provided by the following manner, namely, the casings 203 and 203′ accommodating therein the conveyor units 201 and 201′ to form the horizontal circulating tracks are mounted, through the coupling unit 200 incorporating the drive source, on the pedestals 202 to extend over a desired section length.

While this embodiment is the same with the embodiment of FIG. 41 in that the upper wall surfaces 210 and 210′ of the casings 203 and 203′ are utilized as the supporting traveling surfaces over which the supporting wheels 208 and 208′ roll, in the embodiment of FIG. 42, by virtue of the fact that the openings 207 of the casings 203 and 203′ are opened laterally, the field systems 206 and 206′ are held in place by the supporting structures 205 and 205′ so that the field system 206 and 206′ are inwardly opposed to each other with the pair of magnetic belt surfaces placed therebetween, and consequently a sufficient magnetic attraction is produced between the field systems and the pair of the magnetic belts, thus allowing the magnetic attraction to serve the double functions of driving and guiding the car 204. Thus, there is no need to especially provide any guide track surfaces on the casings 203 and 203′ as in the embodiment of FIG. 41, and this has the effect of making the resulting conveyor lines small in size and also making small and compact the field system supporting structures 205, 205′ provided on the lower portion of the car 204.

According to the embodiments of FIGS. 41 and 42, a pair of parallel conveyor lines comprising the conveyor units arranged in line, are arranged symmetrically with the center line Y-Y′, and this gives to a problem with the speed of the right and left belts in a curved section. However, there is of course provided a suitable speed changing mechanism to permit a difference in speed between the parallel conveyor units, and the speed changing mechanism is adjusted to produce a desired speed difference at a curved track so that the belt speeds of the inner and outer conveyor units are changed to speeds corresponding to the respective curved track radiuses, thus practically eliminating the occurrence of any slip between the magnetic belt surfaces and the car field systems and thereby ensuring easy traveling round the curves.

In addition, the fact that the conveyor units and the car field systems are arranged symmetrical with the center line of the track is fully effective in reducing the sidewise oscillation of the car in the traveling direction thereof.

Figure 43:
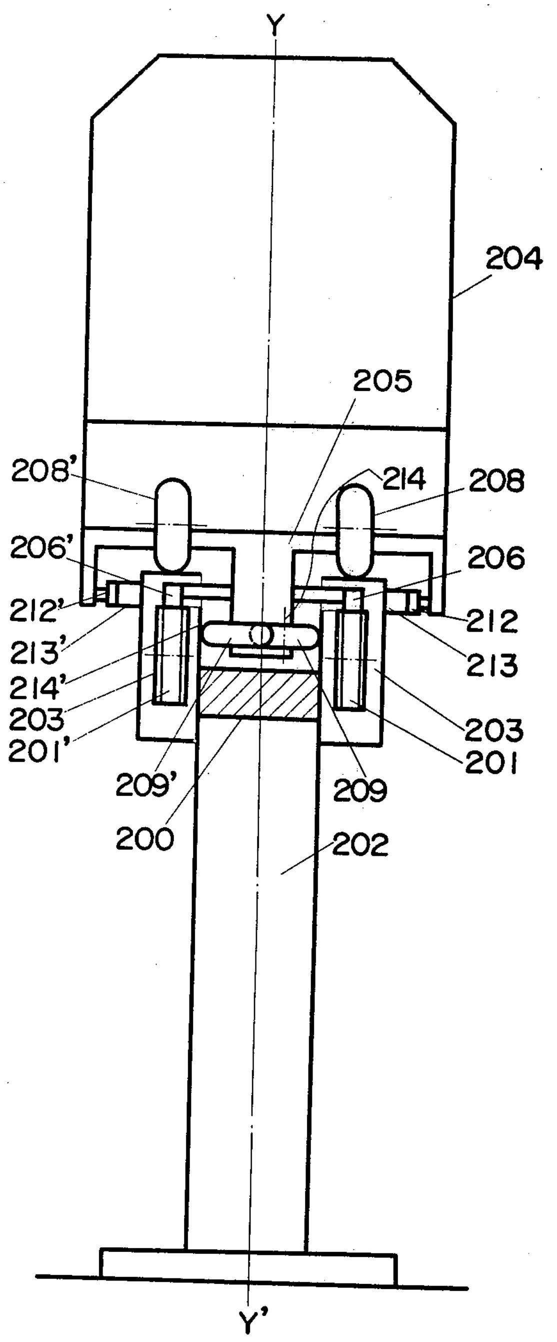
FIG. 43 is a similar front view of still another embodiment.

FIG. 43 shows still another embodiment which is a modification of the embodiment shown in FIG. 41. In other words, this embodiment features in that the casings 203 and 203′ accommodating the conveyor units 201 and 201′ are arranged, with the coupling unit 200 placed therebetween, symmetrical with the center line Y-Y′ thus forming a pair of parallel conveyor lines, and the inner side walls of the casings 203 and 203′ are utilized as the guide track surfaces.

In this embodiment, the guide wheels 209 and 209′ are positioned laterally so that their shafts 214 and 214′ are symmetrical with the center line Y-Y′ and staggered in the traveling direction of the car, and the thusly arranged guide wheels 209 and 209′ are laid on the supporting structures 205, 205′ of the car 204 together with sufficient spring means which tend to expand the guide wheels 209 and 209′ laterally outwardly, thereby causing the guide wheels 209 and 209′ to be pressed and rolled on inner wall surfaces of the casings 203 and 203′ and thus guiding the car along the track.

Since the guide tracks are provided by the inner wall surfaces of the casings 203 and 203′, the conveyor units 201 and 201′ define openings in the upper portions of the inner walls of the casings 203 and 203′ so as to insert the car field systems 206 and 206′ through said openings and to place these field systems oppositely to the conveyor units 203 and 203′.

Where electromagnets are used for the car field systems 206 and 206′, the energizing power for the electromagnets and the power to the car equipment such as the electric power supply for illuminating the inside of cars may be provided by for example installing feeder wires 213 and 213′ on both sides of the casings 203 and 203′ and mounting current collectors 212 and 213 on the lower portion of the 204 so as to be supplied with said power by for example sliding on the feeder wires 213 and 213′. It is needless to say that if electromagnets are used for the car field systems in the embodiments shown in FIGS. 41 and 42, it is only necessary to arrange the necessary feeder wires and current collectors in the similar configuration.

We claim:

1. A belt conveyor type transportation system by magnetic attraction comprising at least one conveyor line including a plurality of conveyor units arranged successively, each of said conveyor units comprising endless belt means including a magnetic material as a constituent element encircled around on a pair of a driving wheel and idle wheel to be driven therearound at a respective speed independent of the speeds of the other units, and at least one moving body disposed on said conveyor line, said moving body including magnet means for magnetically attracting said magnetic belts, whereby said moving body is moved forcibly along said conveyor line by following the circulating speed of the magnetic belt means of each of said conveyor units, said belt means having a length corresponding to the distance between shafts at both ends of conveyor units and being equal to the length of said magnet means for attaining linear, continuous acceleration without frictional slippage, said magnet means being constantly energized to produce magnetic attraction strong enough to overcome the friction force due to the load added to the magnet belt means by the magnet means, said magnet means being attracted by magnetic force towards the surface of the magnet belt means and being in facing relation therewith at less than a predetermined gap, said magnet means being constructed so that magnetic attaction between two conveyor units is made when the magnet means passes through a portion between the two conveyor units, the ratio of the magnetic attraction between the two units varying gradually with the movement of the magnet means, such that when the velocities of the magnetic belts of both units are different, the velocity of the moving body is varied linearly and gradually from the velocity of one unit to the velocity of the other unit accompanied with slip wherein a plurality of said conveyor lines each including said moving body and a plurality of said conveyor units having, in terms of their own magnetic belt speeds, steplike speed differences with one another, are arranged along at least one side of a car travel line of a continuously operated transportation system, the traveling distance of the moving body required for the moving body speed to synchronize with the conveyor units having different speeds being dependent on the positional dimension of the magnetic means facing the magnetic belt.

2. A transportation system according to claim 1 wherein said plurality of said conveyor lines are of the same construction and are arranged along at least said one side of said car travel line in parallel thereto, each of said conveyor lines including a first low constant speed section of a speed which permits pedestrians to pass thereto from the ground, an acceleration section of a speed distribution which increases step-wise, a high constant speed section of a speed which permits transfer of pedestrians between continuously operated cars and said high constant speed section, a deceleration section of a speed distribution which decreases stepwise, and a second low constant speed section of a speed which permits pedestrians to alight on the ground and wherein the moving body is disposed on each of the conveyor lines and that pedestrians pass onto the moving body or they are transferred on said moving body.

3. A transportation system according to claim 2, comprising a separate belt conveyor placed between said high constant speed section and said cars in parallel thereto, said belt conveyor being moved around in the same direction as said high constant speed section and at a speed in the range between the speeds of said high constant speed section and said transportation cars.

4. A transportation system according to claim 1, wherein said plurality of conveyor line are arranged in parallel to said car travel line in such a manner that the magnitude of speed of the conveyor units in the adjoining conveyor lines arranged in a lateral direction perpendicular to the direction of travel of the cars decreases by one rank as said conveyor lines become more remote from said car travel line and wherein the moving body is disposed on each of the conveyor lines and that pedestrians pass onto the moving body or they are transferred on said moving body.

5. A transportation system according to claim 1, wherein said plurality of said conveyor lines are arranged continuously in a multiple stage configuration along said car travel line of continuously operated transportation cars between a constant car speed section of said car travel line and a stationary or stopping place on the ground, wherein in each stage of said multiple stage conveyor lines the speed of the conveyor unit at one end nearer to said stationary place said is $\frac{1}{2}$ the speed of the conveyor unit at the other end nearer to the constant car speed section, wherein at the connections between respective stages of said multiple stage conveyor lines the conveyor units at respective ends of the adjoining conveyor lines are of the same speed and arranged parallel to one another in an overlapped relation, and wherein in the direction from said constant car speed section to said stationary place, each following stage of said multiple stage conveyor lines are arranged in parallel and have twice as many lines as included in a preceding stage and wherein the moving body is disposed on each of the conveyor lines and that pedestrians pass onto the moving body or they are transferred on said moving body.

* * * * *